United States Patent [19]

Lysakowski, Jr.

[11] Patent Number: 5,434,971

[45] Date of Patent: Jul. 18, 1995

[54] SYSTEM FOR CONSTRUCTING A TABLE DATA STRUCTURE BASED ON AN ASSOCIATED CONFIGURATION DATA STRUCTURE AND LOADING IT WITH CHEMICAL SAMPLE PHYSICAL DATA

[75] Inventor: Richard S. Lysakowski, Jr., Wayland, Mass.

[73] Assignee: Digital Equipment Corp., Maynard, Mass.

[21] Appl. No.: 722,751

[22] Filed: Jun. 28, 1991

[51] Int. Cl.$^6$ .............................................. G06F 15/40
[52] U.S. Cl. ..................... 395/200; 395/500; 395/600; 395/700; 364/DIG. 1; 364/238.6; 364/239; 364/239.3; 364/260.4; 364/282.1
[58] Field of Search ............... 364/200, 900; 395/157, 395/425, 600, 50, 200, 500, 700

[56] References Cited

U.S. PATENT DOCUMENTS

| | | | |
|---|---|---|---|
| 4,468,732 | 8/1984 | Raver | 364/200 |
| 4,485,439 | 11/1984 | Rothstein | 364/200 |
| 4,649,515 | 3/1987 | Thompson et al. | 364/900 |
| 4,774,661 | 9/1988 | Kumpati | 364/300 |
| 4,800,523 | 1/1989 | Gerety et al. | 364/900 |
| 4,802,115 | 1/1989 | Ginn | 364/900 |
| 4,868,785 | 9/1989 | Jordan et al. | 364/900 |
| 4,953,080 | 8/1990 | Dysart et al. | 364/200 |
| 5,008,853 | 4/1991 | Bly et al. | 364/900 |
| 5,055,998 | 10/1991 | Wright et al. | 395/800 |
| 5,121,478 | 6/1992 | Rao | 395/157 |
| 5,130,924 | 7/1992 | Barker et al. | 364/419.1 |
| 5,142,674 | 8/1992 | Barker et al. | 395/600 |
| 5,157,777 | 10/1992 | Lai et al. | 395/425 |
| 5,168,565 | 12/1992 | Morita | 395/600 |
| 5,182,793 | 1/1993 | Alexander et al. | 395/13 |
| 5,195,172 | 3/1993 | Elad et al. | 395/50 |
| 5,222,160 | 6/1993 | Sakai et al. | 382/57 |
| 5,255,356 | 10/1993 | Michelman et al. | 395/148 |
| 5,276,870 | 1/1994 | Shan et al. | 395/600 |

Primary Examiner—Thomas C. Lee
Assistant Examiner—Wayne Amsbury
Attorney, Agent, or Firm—Christine M. Kuta; A. Sidney Johnston

[57] ABSTRACT

An apparatus for storing and retrieving data acts as an interface between modules such as data collection devices and data analysis tools. The apparatus comprises a means for storing a configuration data structure, the configuration data structure having a plurality of data items. The attributes of a data item are a name, a data type, a size, and a mapping parameter. The plurality of data items may contain administrative data, instrument identification data, global sample identification data, detection method data, raw unprocessed data, data peak processing method, data peak processing results, instrument calibration data, multicomponent sample calibration method, results from multicomponent sample calibration, sample sequence data, dimension data, control events for instrument data, reprocessing method data, and reprocessing results data. The apparatus provides the capability of maintaining a data standard so the number of translation tools needed to transfer data from one module to another is reduced. the apparatus maintains the data standard by means for storing a configuration data structure having table data structures. The configuration data structure and the table data structure define a data model. The data model is editable. Complex, as well as simple, items may be stored in the table data structure.

17 Claims, 21 Drawing Sheets

| NAME | DATATYPE |
|---|---|
| 1. DATASET-COMPLETENESS | CHAR-ARRAY [31] |
| 2. REVISION-LEVEL | CHAR-ARRAY [31] |
| 3. ADMINISTRATIVE-COMMENTS | CHAR-ARRAY [31] |
| 4. CHROMATOGRAM-ORIGIN | CHAR-ARRAY [31] |
| 5. CHROMATOGRAM-OWNER | CHAR-ARRAY [31] |
| 6. DATE-TIME-STAMP | FLOAT-ARRAY [4] |
| 7. EXPERIMENT-TITLE | CHAR-ARRAY [31] |
| 8. FORMAT-TYPE | CHAR-ARRAY [31] |
| 9. OPERATOR-NAME | CHAR-ARRAY [63] |
| 10. SOURCE-FILE-REFERENCE | CHAR-ARRAY [255] |
| 11. EXPERIMENT-CROSS-REFERENCE | CHAR-ARRAY [n][63] |
| 12. EXTERNAL-FILE-REFERENCES | CHAR-ARRAY [n][63] |
| 13. LANGUAGES | CHAR-ARRAY [63] |
| 14. SEPARATION-EXPERIMENT-TYPE | CHAR-ARRAY [31] |
| 15. NUMBER-TIMES-REPROCESSED | INTEGER |
| 16. NUMBER-TIMES-RECALIBRATED | INTEGER |
| 17. RECALIBRATION-HISTORY | CHAR-ARRAY [N][255] |
| 18. POST-EXPERIMENT-PROGRAM-NAME | CHAR-ARRAY [63] |
| 19. PRE-EXPERIMENT-PROGRAM-NAME | CHAR-ARRAY [63] |
| 20. ERROR-LOG | CHAR-ARRAY [63] |

FIG. 6A

1) GAS LIQUID CHROMATOGRAPHY
2) GAS SOLID CHROMATOGRAPHY
   LIQUID CHROMATOGRAPHY
3)     NORMAL PHASE LC
4)     REVERSED PHASE LC
5)     ION EXCHANGE LC
6)     SIZE EXCLUSION LC
7)     ION PAIR LC
8)     OTHER
8) SUPERCRITICAL FLUID CHROMATOGRAPHY
9) THIN LAYER CHROMATOGRAPHY
9) FIELD FLOW FRACTIONATION
10) CAPILLARY ZONE ELECTROPHORESIS

FIG. 6B

| NAME | DATATYPE |
|---|---|
| 1. NUMBER-INSTRUMENT-COMPONENTS | INTEGER |
| 2. COMPONENT TYPE | INTEGER |
| 3. COMPONENT-ID | CHAR-ARRAY [31] |
| 4. COMPONENT-MFGR | CHAR-ARRAY [31] |
| 5. COMPONENT-MODEL-NUMBER | CHAR-ARRAY [31] |
| 6. COMPONENT-SERIAL-NUMBER | INTEGER |
| 7. COMPONENT-ID-COMMENTS | CHAR-ARRAY [255] |
| 8. COMPONENT-SOFTWARE-VERSION | CHAR-ARRAY [63] |
| 9. COMPONENT-FIRMWARE-VERSION | CHAR-ARRAY [31] |
| 10. CURRENT-OS-REVISION | CHAR-ARRAY [31] |
| 11. CURRENT-APPL-SW-REVISION | CHAR-ARRAY [31] |
| 12. CURRENT-LAYERED-PRODUCT VERSIONS | CHAR-ARRAY [n][31] |

FIG. 6C

| NAME | DATATYPE |
|---|---|
| 1. NUMBER-OF-COLUMNS | INTEGER |
| 2. COLUMN-NAME | CHAR-ARRAY [31] |
| 3. COLUMN-LENGTH-NOMINAL | FLOATING-POINT |
| 4. COLUMN-LENGTH-ACTUAL | FLOATING-POINT |
| 5. COLUMN-DIAMETER | FLOATING-POINT |
| 6. COLUMN-VOID-VOLUME | CHAR-ARRAY [31] |
| 7. COLUMN-PACKING-TYPE | CHAR-ARRAY [31] |
| 8. COLUMN-STATIONARY-PHASE | CHAR-ARRAY [31] |
| 9. COLUMN-PARTICLE-SIZE | FLOATING-POINT |
| 10. COLUMN-PARTICLE-SHAPE | CHAR-ARRAY [31] |
| 11. COLUMN-PORE-SIZE | FLOATING-POINT |
| 12. COLUMN-PACKING-IDENTITY | INTEGER |
| 13. COLUMN-INSTALLATION-DATE | DATETIME |
| 14. COLUMN-ID-COMMENTS | CHAR-ARRAY [255] |

FIG. 6D

| NAME | DATATYPE |
|---|---|
| 1. SAMPLING-PROCEDURE-NAME | CHAR-ARRAY [63] |
| 2. SAMPLE-PREPARATION-PROCEDURE | CHAR-ARRAY [255] |
| 3. SAMPLE-STATE | INTEGER |
| 4. SAMPLE-MATRIX | INTEGER |
| 5. SAMPLE-STORAGE-INFORMATION | CHAR-ARRAY [255] |
| 6. SAMPLE-DISPOSAL-INFORMATION | CHAR-ARRAY [255] |
| 7. SAMPLE-HISTORY | CHAR-ARRAY [255] |
| 8. SAMPLE-PREP-COMMENTS | CHAR-ARRAY [255] |
| 9. SAMPLE-ID-COMMENTS | CHAR-ARRAY [255] |

FIG. 6E

| NAME | DATATYPE |
|---|---|
| 1. DETECTION-METHOD-TABLE-NAME | CHAR-ARRAY [63] |
| 2. DETECTOR-NAME | CHAR-ARRAY [63] |
| 3. NUMBER-OF-DETECTORS | INTEGER |
| 4. NUMBER-OF-CHANNELS | INTEGER |
| 5. CHANNEL-NAME | CHAR-ARRAY [31] |
| 6. CHANNEL-NUMBER | INTEGER |
| 7. CHANNEL-WAVELENGTH[t, CHANNEL] | FLOATING-POINT |
| 8. CHANNEL-RANGE[t,CHANNEL] | FLOATING-POINT |
| 9. DETECTOR-RESPONSE-TIME-CONSTANT | FLOATING-POINT |
| 10. DETECTOR-MAXIMUM-VALUE | FLOATING-POINT |
| 11. DETECTOR-MINIMUM-VALUE | FLOATING-POINT |
| 12. DETECTOR-METHOD-COMMENTS | CHAR-ARRAY [63] |

FIG. 6F

| NAME | DATATYPE |
|---|---|
| 1. ADC-METHOD-TABLE-NAME | CHAR-ARRAY [31] |
| 2. NOMINAL-NUMBER-POINTS[CHANNEL] | INTEGER [15] |
| 3. SAMPLING-RATE[CHANNEL] | FLOAT ARRAY [15] |
| 4. ADC-BUNCH-FACTOR[CHANNEL] | INTEGER [15] |
| 5. ADC-START-TIME[CHANNEL] | FLOAT ARRAY [15] |
| 6. ADC-DELAY-TIME[CHANNEL] | FLOAT ARRAY [15] |
| 7. ADC-RANGE[CHANNEL] | FLOAT ARRAY [15] |
| 8. ADC-OFFSET[CHANNEL] | FLOAT ARRAY [15] |
| 9. ADC-HIGH-VALUE | FLOATING-POINT |
| 10. ADC-UNIT-CONVERSION-FACTOR | FLOATING-POINT |

FIG. 6G

| NAME | DATATYPE |
|---|---|
| 1. NUMBERS-POINTS | INTEGER |
| 2. ACTUAL-RUN-TIME-LENGTH | FLOATING-POINT |
| 3. ACTUAL-SAMPLING-PERIOD | FLOATING-POINT |
| 4. ACTUAL-DELAY-TIME | FLOATING-POINT |
| 5. RAW-DATA-ARRAY | FLOATING-POINT |
| 6. NON-UNIFORM-SAMPLING-FLAG | BOOLEAN |
| 7. ABCISSA-SCALE-FACTOR | FLOATING-POINT |
| 8. ORDINATE-SCALE-FACTOR | FLOATING-POINT |
| 9. ORDINATE-OFFSET | FLOATING-POINT |
| 10. ABCISSA-UNITS | CHAR-ARRAY [31] |
| 11. ORDINATE-UNITS | CHAR-ARRAY [31] |

FIG. 6H

| NAME | DATATYPE |
| --- | --- |
| 1. PEAK-PROCESSING-METHOD-TABLE-NAME | CHAR-ARRAY [31] |
| 2. MAXIMUM-PEAK-WIDTH[t] | FLOAT-ARRAY [n] |
| 3. MINIMUM-PEAK-WIDTH[t] | FLOAT-ARRAY [n] |
| 4. EVENTS-TRACK-REFERENCE-PEAK | BOOLEAN |
| 5. WATER-DIP-DETECTION | BOOLEAN |
| 6. MANUALLY-REINTEGRATED-PEAKS | FLOAT-ARRAY [n] |
| 7. PEAK-PROCESSING-TIMED-EVENTS[t] | FLOAT-ARRAY [n] |
| 8. SLOPE-SENSITIVITY[t] | FLOAT-ARRAY [n] |
| 9. SLOPE-MULTIPLIER[t] | FLOAT-ARRAY [n] |
| 10. INTEGRATION-SENSITIVITY[t] | FLOAT-ARRAY [n] |
| 11. BASELINE-THRESHOLD-MULTIPLIER[t] | FLOAT-ARRAY [n] |
| 12. PEAK-REJECTION-WIDTH[t] | FLOAT-ARRAY [n] |
| 13. PEAK-REJECTION-HEIGHT[t] | FLOAT-ARRAY [n] |
| 14. PEAK-REJECTION-AREA[t] | FLOAT-ARRAY [n] |
| 15. PEAK-REJECTION-ON-TIME[t] | FLOAT-ARRAY [n] |
| 16. PEAK-REJECTION-OFF-TIME[t] | FLOAT-ARRAY [n] |
| 17. ABSOLUTE-SEARCH-WINDOW[t] | FLOAT-ARRAY [n] |
| 18. RELATIVE-SEARCH-WINDOW[t] | FLOAT-ARRAY [n] |
| 19. AUTO-ZERO-POINTS[t] | FLOAT-ARRAY [n] |
| 20. SKIM-RATIO[t] | FLOAT-ARRAY [n] |
| 21. SOFTWARE-BUNCH-FACTOR[t] | FLOAT-ARRAY [n] |
| 22. PERCENT-WINDOW[t] | FLOAT-ARRAY [n] |
| 23. PEAK-PROCESSING-METHOD-COMMENTS | CHAR-ARRAY [255] |

FIG. 6I

| NAME | DATATYPE |
| --- | --- |
| 1. PEAK-PROCESSING-RESULTS-TABLE-NAME | CHAR-ARRAY [31] |
| 2. PEAK-IDENTIFIER | INTEGER |
| 3. PEAK-RETENTION-TIME | FLOATING-POINT |
| 4. PEAK-NAME | CHAR-ARRAY [31] |
| 5. PEAK-START | FLOATING-POINT |
| 6. PEAK-END | FLOATING-POINT |
| 7. PEAK-AREA | FLOATING-POINT |
| 8. PEAK-HEIGHT | FLOATING-POINT |
| 9. BASELINE-START-TIME | FLOATING-POINT |
| 10. BASELINE-START-VALUE | FLOATING-POINT |
| 11. BASELINE-STOP-TIME | FLOATING-POINT |
| 12. BASELINE-STOP-VALUE | FLOATING-POINT |
| 13. PEAK-DETECTION-CODE | INTEGER |
| 14. RETENTION-INDEX | FLOATING-POINT |
| 15. MIGRATION-TIME | FLOATING-POINT |
| 16. PEAK-ASYMMETRY | FLOATING-POINT |
| 17. PEAK-AREA-SQUARE-ROOT | FLOATING-POINT |

FIG. 6J

| NAME | DATATYPE |
|---|---|
| 1. CALIBRATION-METHOD-TABLE-NAME | CHAR-ARRAY [31] |
| 2. ORIGIN-USAGE | INTEGER |
| 3. DATA-ACQUISITION-ONLY-FLAG | BOOLEAN |
| 4. CALIBRATION-DONE | BOOLEAN |
| 5. AREA-OR-HEIGHT-FLAG | BOOLEAN |
| 6. CALIBRATION-LEVEL-NAME[LEVEL] | CHAR-ARRAY [n][63] |
| 7. CURVE-FIT-EQUATION[LEVEL] | CHAR-ARRAY [n][63] |
| 8. BACKGROUND-CORRECTION-FUNCTION-FLAG | BOOLEAN |
| 9. BACKGROUND-CORRECTION-FUNCTION[t] | CHAR-ARRAY [63,t] |
| 10. DECONVOLUTION-FUNCTION[t] | CHAR-ARRAY [63,t] |
| 11. CONVOLUTION-FUNCTION[t] | CHAR-ARRAY [63,t] |
| 12. SMOOTHING-FUNCTION[t] | CHAR-ARRAY [63,t] |
| 13. ISTD-PEAK-REF-NUMBER | INTEGER |
| 14. INT-STD-AMOUNT[AUTOSAMPLER-POSITION] | FLOAT-ARRAY [127] |
| 15. PEAK-PROCESSING-METHOD-TABLE-NAME | CHAR-ARRAY [31] |
| 16. PEAK-PROCESSING-RESULTS-TABLE-NAME | CHAR-ARRAY [31] |
| 17. CALIBRATION-METHOD-COMMENTS | CHAR-ARRAY [255] |
| 18. LEVEL-NUMBER | INTEGER |
| 19. STANDARD-TYPE-CODE | INTEGER |
| 20. BRACKETING-FUNCTION-CODE | INTEGER |
| 21. BRACKETING-FLAG | BOOLEAN |
| 22. UNKNOWN-REFERENCE-PEAK-FLAG[COMPONENT-NUMBER] | BOOLEAN |
| 23. RETENTION-REFERENCE-PEAK-FLAG[COMPONENT-NUMBER] | BOOLEAN |
| 24. CURVE-AXES-CONVENTION | CHAR-ARRAY [31] |
| 25. DEFAULT-RESPONSE-FACTOR | FLOATING-POINT |

FIG. 6K

| NAME | DATATYPE |
|---|---|
| 1. CALIBRATION-STANDARD-COMPOUND-NAME | CHAR-ARRAY [31] |
| 2. STANDARD-CONCENTRATIONS[LEVEL] | FLOAT-ARRAY [31] |
| 3. EXPECTED-RETENTION-TIME[LEVEL] | FLOATING-POINT |
| 4. COMPONENT-PERCENT-WINDOW | FLOATING-POINT |
| 5. BASELINE-MAGNITUDE[t, LEVEL] | FLOAT-ARRAY [t,31] |
| 6. COMPONENT-LEVEL-AMOUNT | FLOATING-POINT |
| 7. COMPONENT-RESPONSE-FACTOR | FLOATING-POINT |
| 8. COMPONENT-QUANTITATION-TYPE | INTEGER |

FIG. 6L

| NAME | DATATYPE |
| --- | --- |
| 1. PEAK-NUMBER | INTEGER |
| 2. COMPONENT-RETENTION-TIME | FLOATING-POINT |
| 3. COMPONENT-AMOUNT | FLOATING-POINT |
| 4. COMPONENT-PEAK-NAME | CHAR-ARRAY [31] |
| 5. COMPONENT-START | FLOATING-POINT |
| 6. COMPONENT-END | FLOATING-POINT |
| 7. COMPONENT-AREA | FLOATING-POINT |
| 8. COMPONENT-HEIGHT | FLOATING-POINT |
| 9. COMPONENT-HEIGHT-PERCENT | FLOATING-POINT |
| 10. COMPONENT-AREA-PERCENT | FLOATING-POINT |
| 11. COMPONENT-PERCENT-WINDOW | FLOATING-POINT |
| 12. COMPONENT-BASELINE-START-TIME | FLOATING-POINT |
| 13. COMPONENT-BASELINE-STOP-TIME | FLOATING-POINT |
| 14. CALIBRATION-EQUATION | INTEGER |
| 15. CALIBRATION-GROUP-NUMBER | INTEGER |
| 16. CURVE-FIT-TYPE | INTEGER |
| 17. CURVE-WEIGHTING | INTEGER |
| 18. REFERENCE-PEAK-NAME | CHAR-ARRAY [31] |
| 19. REFERENCE-PEAK-NUMBER | INTEGER |
| 20. COMMERCIAL-NAME | CHAR-ARRAY [31] |
| 21. MOLECULAR-FORMULA | CHAR-ARRAY [31] |
| 22. MOLECULAR-WEIGHT | INTEGER |

FIG. 6M

| NAME | DATATYPE |
|---|---|
| 1. SEQUENCE-METHOD-NAME | CHAR-ARRAY [63] |
| 2. SEQUENCE-FILE-ID | CHAR-ARRAY [31] |
| 3. NUMBER-OF-SEQUENCE-INJECTIONS | INTEGER |
| 4. SEQUENCE-NUMBER[SAMPLE-NUMBER] | INTEGER |
| 5. SAMPLE-NAME | CHAR-ARRAY [31] |
| 6. SAMPLE-BAR-CODE-NUMBER | INTEGER |
| 7. ALIQUOT-NUMBER | INTEGER |
| 8. REPLICATION-NUMBER | INTEGER |
| 9. BATCH-NUMBER | CHAR-ARRAY [31] |
| 10. EXTERNAL-ID | CHAR-ARRAY [31] |
| 11. INTERNAL-ID | CHAR-ARRAY [31] |
| 12. AUTOSAMPLER-POSITION | FLOAT-ARRAY [63] |
| 13. SAMPLE-TOTAL-AMOUNT | FLOATING-POINT |
| 14. ACTUAL-VOLUME-INJECTED | FLOATING-POINT |
| 15. DILUTION-FACTOR | FLOATING-POINT |
| 16. INTERNAL-STD-AMOUNT | FLOATING-POINT |
| 17. SAMPLE-TYPE | INTEGER |
| 18. SAMPLE-COMMENTS | CHAR-ARRAY [255] |
| 19. RERUN-FULL-METHOD | BOOLEAN |
| 20. REPROCESS-ONLY | BOOLEAN |
| 21. DETECTION-METHOD-TABLE | CHAR-ARRAY [31] |
| 22. ADC-METHOD-TABLE | CHAR-ARRAY [31] |
| 23. RAW-DATA-TABLE | CHAR-ARRAY [31] |
| 24. PEAK-PROCESSING-METHOD-TABLE | CHAR-ARRAY [31] |
| 25. PEAK-PROCESSING-RESULTS | CHAR-ARRAY [31] |
| 26. CALIBRATION-METHOD-TABLE | CHAR-ARRAY [31] |
| 27. CALIBRATION-RESULTS-TABLE | CHAR-ARRAY [31] |
| 28. COMPONENT-PROC-METHOD-TABLE | CHAR-ARRAY [31] |
| 29. COMPONENT-PROC-RESULTS-TABLE | CHAR-ARRAY [31] |
| 30. REPORTING-METHOD-TABLE | CHAR-ARRAY [31] |
| 31. PLOTTING-METHOD-TABLE | CHAR-ARRAY [31] |
| 32. POST-EXPERIMENT-EVENTS-TABLE | CHAR-ARRAY [31] |
| 33. SEQUENCE-COMMENTS | CHAR-ARRAY [255] |

FIG. 6N

| DIMENSION-NAME | CURRENT-DIMENSION-SIZE |
| --- | --- |
| 1. SAMPLE-NUMBER | NUMBER-OF-SAMPLES |
| 2. SCAN-NUMBER | NUMBER-OF-SCANS |
| 3. CHANNEL | NUMBER-OF-CHANNELS |
| 4. t | UNLIMITED |
| 5. LEVEL | NUMBER-OF-CALIBRATION-LEVELS |
| 6. INSTRUMENT-COMPONENT-NUMBER | NUMBER-OF-INSTRUMENT-COMPONENTS |
| 7. COLUMN-NUMBER | NUMBER-OF-COLUMNS |
| 8. INJECTION-NUMBER | NUMBER-OF-INJECTIONS |
| 9. PUMP-NUMBER | NUMBER-OF-PUMPS(1 TO 4 TYPICALLY) |
| 10. CONTROL-EVENT-TYPE | NUMBER-OF-CONTROL EVENTS |
| 11. PROCESSING-EVENT-TYPE | NUMBER-OF-PROCESSING-EVENTS |
| 12. DETECTED-PEAK-NUMBER | NUMBER-OF-DETECTED-PEAKS |
| 13. CALIBRATION-PEAK-NUMBER | NUMBER-OF-CALIBRATION-PEAKS |
| 14. COMPONENT-PEAK-NUMBER | NUMBER-OF-COMPONENT-PEAKS |
| 15. AUTOSAMPLER-POSITION-NUMBER | NUMBER-OF-AUTOSAMPLER-POSITIONS |

FIG. 6O

| NAME | DATATYPE |
| --- | --- |
| 1. INSTRUMENT-CONTROL-EVENT-TABLE-NAME | CHAR-ARRAY [63] |
| 2. CONTROL-EVENT-NAME | FLOATING-POINT |
| 3. CONTROL-EVENT-MAGNITUDE[EVENT-NAME,t] | FLOATING-POINT |
| 4. MOBILE-PHASE-PROGRAM-FLAG | BOOLEAN |
| 5. MOBILE-PHASE[%A,%B,%C,t,CURVE-TYPE] | FLOAT-ARRAY [n,t] |
| 6. FLOW-RATE-PROGRAM[t] | FLOAT-ARRAY [n,t] |
| 7. CARRIER-GAS-PROGRAM[t] | FLOAT-ARRAY [t] |
| 8. COLUMN-TEMPERATURE-PROGRAM[t] | FLOAT-ARRAY [t] |
| 9. INSTRUMENT-CONTROL-COMMENTS | CHAR-ARRAY [255] |

FIG. 6P

| NAME | DATATYPE |
|---|---|
| 1. REPROCESSING-METHOD-NAME | CHAR-ARRAY [31] |
| 2. RERUN-FULL-METHOD | BOOLEAN |
| 3. REPROCESS-ONLY | CHAR-ARRAY [31] |
| 4. RECALIBRATE-ONLY | BOOLEAN |
| 5. RECALIBRATION-LEVEL | FLOATING-POINT |
| 6. RECALIBRATION-STRIDE | INTEGER |
| 7. RECALIBRATION-UPDATE-TECHNIQUE | INTEGER |
| 8. DETECTION-METHOD-TABLE | CHAR-ARRAY [31] |
| 9. ADC-METHOD-TABLE | CHAR-ARRAY [31] |
| 10. RAW-DATA-TABLE | CHAR-ARRAY [31] |
| 11. PEAK-PROCESSING-METHOD-TABLE | CHAR-ARRAY [31] |
| 12. PEAK-PROCESSING-RESULTS | CHAR-ARRAY [31] |
| 13. CALIBRATION-METHOD-TABLE | CHAR-ARRAY [31] |
| 14. CALIBRATION-RESULTS-TABLE | CHAR-ARRAY [31] |
| 15. COMPONENT-PROCESSING-METHOD-TABLE | CHAR-ARRAY [31] |
| 16. COMPONENT-PROCESSING-RESULTS-TABLE | CHAR-ARRAY [31] |
| 17. REPORTING-METHOD-TABLE | CHAR-ARRAY [31] |
| 18. PLOTTING-METHOD-TABLE | CHAR-ARRAY [31] |
| 19. POST-EXPERIMENT-EVENTS-TABLE | CHAR-ARRAY [31] |

FIG. 6Q

SYSTEM FOR CONSTRUCTING A TABLE DATA STRUCTURE BASED ON AN ASSOCIATED CONFIGURATION DATA STRUCTURE AND LOADING IT WITH CHEMICAL SAMPLE PHYSICAL DATA

RELATED APPLICATIONS

U.S. patent application Ser. No. 07/722,750, now pending, titled "Configuration Data Structure to Facilitate Data Interchange and Storage Using Data Structures with Inheritance," filed by Richard S. Lysakowski, Jr., is related to the present application.

FIELD OF THE INVENTION

This invention relates generally to systems for storing and interchanging analytical data, and more particularly relates to apparatus for storing and interchanging analytical data using data structures with inheritance, and also interchanging analytical data between software modules.

BACKGROUND OF THE INVENTION

The mechanism used for storing retrieving and interchanging data depends upon the data model. The data model is a representation of the data in terms of fields, and convenient groupings of fields into larger structures such as tables. Also, a data model may have logical links between groups of data such as are provided by classes in a hierarchical data structure. Ordinarily, the mechanism used to store data is tailored to the data model chosen to represent the data.

For example, in a spread sheet the data model has: a first table of fields where each field represents a cell of the spread sheet, a second table of headings for the columns; a third table of headings for the rows; and at least one, and possibly several, tables holding the formulas used to calculate the contents of cells designated to hold computed values in the spread sheet.

As a second example, scientific data received in a computer from an instrument measuring physical quantities is represented by a data model having at least the following fields: physical quantity being measured; type of instrument; manufacturer; serial number; date of measurement; time of measurement; sample identification; and many fields for holding the data. The fields holding the data obtained by measuring physical quantities may be one dimensional if only a single number is recorded, or may be two dimensional if two numbers are recorded such as an independent variable and a dependent variable, or the fields may be multidimensional if several independent and dependent physical quantities are recorded.

In addition to simply storing data, it is often convenient to interchange data from one module to another module. For example, in the scientific data area, obtaining measurements from a scientific instrument, and writing the measurements into a spread sheet for mathematical analysis of the measurement data. An even further desirable interchange is to move the calculated results from the spread sheet into another software tool such as a word processor for preparation of written reports, or move the results into an alarm software tool for alerting an operator that physical measurements have exceeded desired bounds. The alarm software tool may accept data directly from the instrument, and may also receive computed results from the spread sheet.

The computer media used for storage of the data include disk units on a local computer, servers on a computer network, disk farms on a computer cluster, magnetic disks reached over a computer communications network, optical storage units reached over a computer communications network, and other diverse computer storage media technologies. In all of these examples of data collected through the use of computer modules, the problem of exchanging data collected by different modules is particularly important.

The need to exchange data collected through different software modules, by way of example, is particularly acute for corporate personnel and financial data. A corporation having many branches, subsidiaries, etc., may have a different computer module at each location collecting the same type of data. Assembling the corporate wide data requires exchanging the output of the diverse computer modules. Accordingly, a continuing problem in modern corporations is to provide a simple and efficient means for exchanging data between different software modules.

An additional desirable feature is that data is often hierarchical by the nature of the data, and it is therefore desirable to provide a hierarchical mechanism for storage and interchange, where the mechanism reflects the hierarchical nature of the data.

A longstanding difficulty in storing and interchanging data between software modules is the incompatibility of the data models used to represent the data in the various modules. In the past, it has been necessary to design an interchange tool for each desired pair of modules, leading to the number of interchange tools increasing at least as fast or faster than the square of the number of modules.

For example, the difficulty in the scientific instrument area arises, in part, from the large number of types of instruments, the variety of manufacturers for each type of instrument, and the large number of data analysis modules available in the marketplace. For example, one instrument and one spread sheet require one interchange tool, two instruments and one spread sheet probably require two interchange tools, but, as in the above example where output of each instrument is directed to two receiving modules such as a spread sheet and an alarm module, four interchange tools are required.

The data model of each type of scientific instrument will depend upon the physical parameter being measured. Instruments for which it is desirable to provide a data storage and interchange format include a gas chromatograph, liquid chromatograph, mass spectrometer, nuclear magnetic resonance spectrometer, etc. Also, the data model used for a receiving module will depend upon the analysis class, such as spread sheet, alarm module, statistical analysis program, or other specialized analysis module.

Each data model will require a plurality of interchange tools to couple the data to the other data models. And the number of required interchange tools rapidly becomes too great to manage, especially with the large number of scientific instruments and large number of analysis tools available to the scientist.

SUMMARY OF THE INVENTION

The invention provides a solution to the data storage and interchange requirements of analytical measurement data obtained from and used by diverse modules.

The invention is an apparatus for storing analytical data. An apparatus for storing analytical measurement data, comprises a means for storing a configuration data structure, the configuration data structure having: a plurality of data items, a one of the plurality of data items further having a name, a data type, a size, and a mapping parameter, the plurality of data items further having, administrative data, instrument identification data, global sample identification data, detection method data, raw unprocessed data, data peak processing method, data peak processing results, instrument calibration data, multicomponent sample calibration method, results from multicomponent sample calibration, sample sequence data, dimension data, control events for instrument data, reprocessing method data, and reprocessing results data. Also there is provided a means for arranging ones of the plurality of data items into at least one group, the at least one group defining a table data structure; a means for storing the table data structure, the table data structure having a plurality of table data values, the table data values arranged in a plurality of columns and in a plurality of rows, a one of the table data values identified by a the column and a the row. Further, there is provided a means, responsive to a one of the data items of the configuration data structure, for defining a one column of the plurality of columns; and, a means, responsive to the mapping parameter of the one the data items, for referencing the one column of the table data structure; and, a means for storing at least one set of data in a predetermined row of the table data structure, and the configuration data structure defines a data model and data corresponding to the model is accommodated in each the row.

The apparatus further has a means for editing the configuration data structure, and the data model is defined by the editing.

The table data values further have the property that, at least one of the table data values is capable of containing an n dimensional array, and the n dimensional array has a plurality of elements.

Also, the table data values further have, at least one of the table data values is capable of containing an arbitrary data structure.

The plurality of data items of the configuration data structure further have indicators of a class, a superclass, and a subclass, to indicate a node location of the data item in a hierarchical data structure.

Other and further aspects of the present invention will become apparent in the course of the following description and be referenced to the accompanying drawings.

BRIEF DESCRIPTION OF THE DRAWINGS

Referring now to the drawings in which like numerals represent like parts in the several views:

FIG. 6-1, FIG. 6-2, FIG. 6-3, FIG. 6-4, FIG. 6-5, FIG. 6-6, FIG. 6-7, FIG. 6-8, FIG. 6-9, FIG. 6-10, FIG. 6-11, FIG. 6-12, FIG. 6-13, FIG. 6-14, FIG. 6-15, FIG. 6-16, FIG. 6-17 are tables in accordance with the invention.

FIG. 8 is block drawing of a virtual dataset in accordance with the invention.

FIG. 9 is a block drawing of a generic instrument in accordance with the invention.

FIG. 10 is a block drawing of a data interchange hub in accordance with the invention.

FIG. 11 is a block drawing of a data interchange hub in accordance with the invention.

FIG. 12 is a block drawing of a data interchange system in accordance with the invention.

FIG. 13 is a block drawing of a computer system in accordance with the invention.

DETAILED DESCRIPTION

Figure 1:
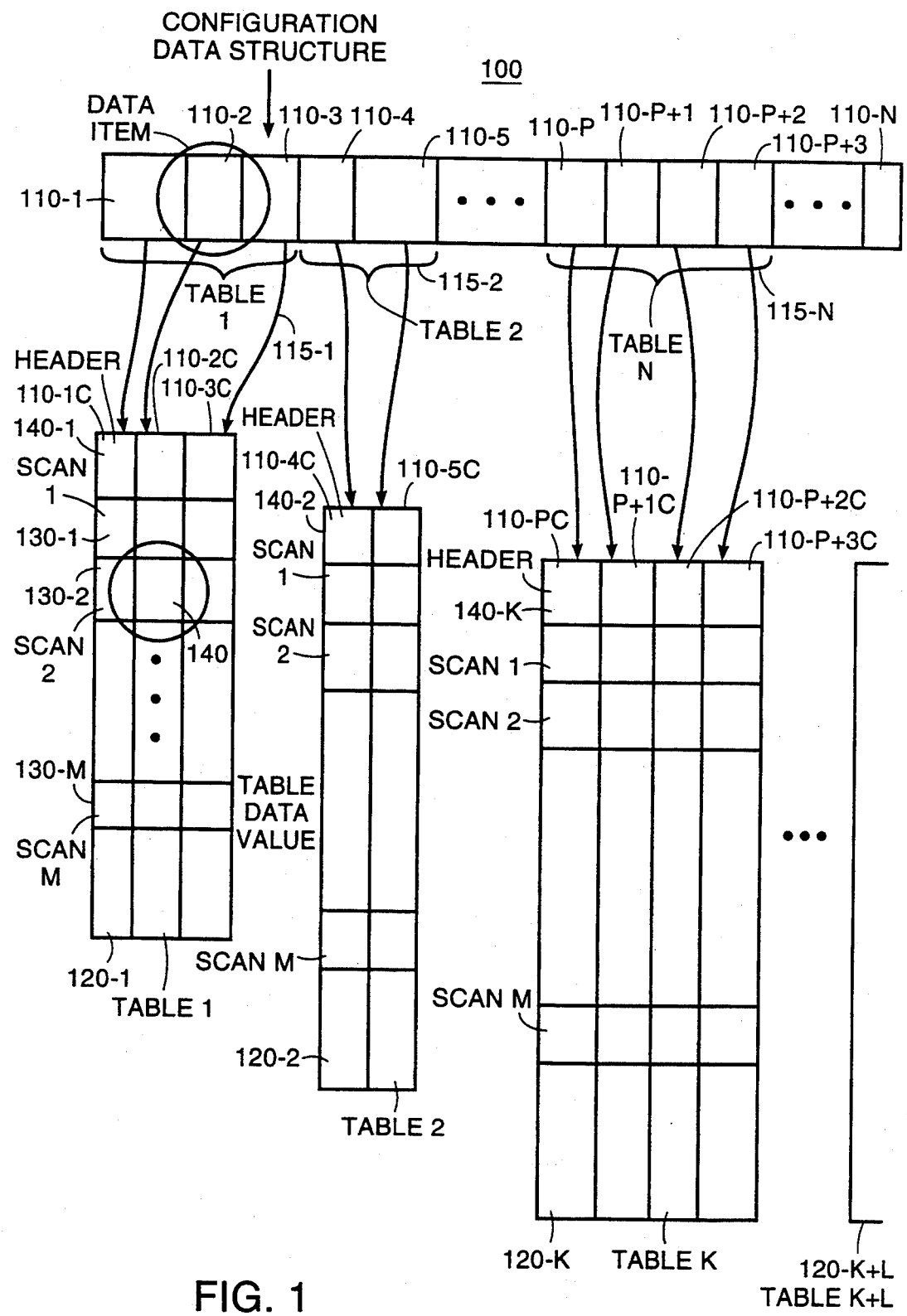
FIG. 1 is a schematic drawing of a data model in accordance with the invention.

Referring now to FIG. 1, configuration data structure 100 is shown with a plurality of data items 110-1, 110-2, 110-3, . . . 110-N. The data items 110-1, 110-2, 110-3, . . . 110-N are grouped by brackets 115-1, 115-2, . . . 115-K, where the grouping by brackets associates the data items into tables 120-1, 120-2, . . . 120-K. The last table 120-K+L corresponds to a last grouping of data items, and including the last data item 110-N.

Tables 120-1, 120-2, . . . 120-K are organized into rows and columns. The columns of each table 120-1, 20-2, . . . 120-K are indicated by reference numerals having a prefix of the corresponding data item 110-1, 110-2, 110-3, . . . 110-N and a suffix C to indicate the column. That is, column 110-1C corresponds to data item 110-1. Column 110-2C corresponds to data item 110-2. Column 110-3C corresponds to data item 110-3. Column 110-PC corresponds to data item 110-P. Column 110-P+1 corresponds to data item 110-P+1. And finally, data item 110-N corresponds to the last column of table 120-K+L.

The rows of tables 120-1, 120-2, . . . 120-K are used to store data. A row from the tables, 120-1, 120-2, . . . 120-K is referred to as a scan line, and scan lines 130-1, 130-2, . . . 130-M hold data. A table data value 140 is defined by an intersection of a column 110-2C and row 130-2. Likewise, each intersection of a column and a row specifies a table data value, such as, for example table data value 140. The data stored in a table data value corresponds to the data item 110-1, 110-2, 110-3, . . . 110-N and the scan line 130-1, 130-2, . . . 130-M.

The configuration data structure 100 coupled with the data storage in tables 120-1, 120-2, . . . . 120-K provides a flexible means for defining the data model and for accumulating an arbitrary number of scan lines of data. The data model is defined by the assignment of attributes to data items. Examples of data item attributes are names, characteristics, and so forth, of the data items 110-1, 110-2, . . . 110-N. A scan line may provide data to each table data value 140 in the scan line, and hence for each corresponding data item. However, some table data values may be left blank as the scan line is stored into the table, as will be discussed more fully hereinbelow. And the arrangement of scan lines of data permits an arbitrary number of scan lines of data to be appended to the tables.

A dedicated editor may be provided to facilitate editing the configuration data structure 100, and thereby facilitate defining the data model. Or alternatively, any editor capable of modifying a computer file may be used to edit the configuration data structure 100.

The stored data is self describing, and the self describing feature is created by a header for each column of each table. Header 140-1 is in table 120-1, header 140-2 is in table 120-2, and so forth so that there is a header associated with each table 120-1, 120-2, ... 120-K+L. The header in a column stores the entry in the corresponding data item 110-1, 110-2, 110-3, ... 110-N from the configuration data structure. For example, if the tables are stored in records on a magnetic disk, then the stored tables are self describing by reason of the data item 110-1, 110-2, 110-3, ... 110-N information stored in the header of each column of each table.

A table data value 140 may, for example, be a single number or a single character. Or alternatively, a table data value 140 may be a two dimensional array of data such as a spread sheet. Or, as a further alternative, a table data value 140 may be an n-dimensional array of data of mixed types, where types includes characters, integers, floating point numbers, and so forth. As a still further alternative, a table data value 140 may be an arbitrary data structure. Any limitation on the type of data structure represented by table data value 140 is simply a result of an incidental limitation of the storage software used to implement storage of the data. That is, a table data value 140 is meant to be a storage location for an arbitrary data structure. An attribute of the corresponding data item 110-1, 110-2, 110-3, ... 110-N of the configuration data structure 100 specifies the type of data structure provided by table data value 140.

A "configuration data structure" is a data structure that defines the configuration for storage of data. The configuration data structure itself is a computer file, and the file may, for example, be written to disk. Or, for a further example, the configuration data structure may be placed into memory of a computer. The configuration defined by the "configuration data structure" is utilized for storage of many sets of data. The concept of "data model" is used to express the relationships between different elements of data stored in the configuration, as defined by the "configuration data structure". Editing the "configuration data structure" changes the data model, as well as changes the configuration in which the data is stored.

An advantage of the present invention is that the "configuration data structure" can be edited. By editing the "configuration data structure" the configuration for storing data, along with the data model, can be easily changed.

Figures 2, 3:
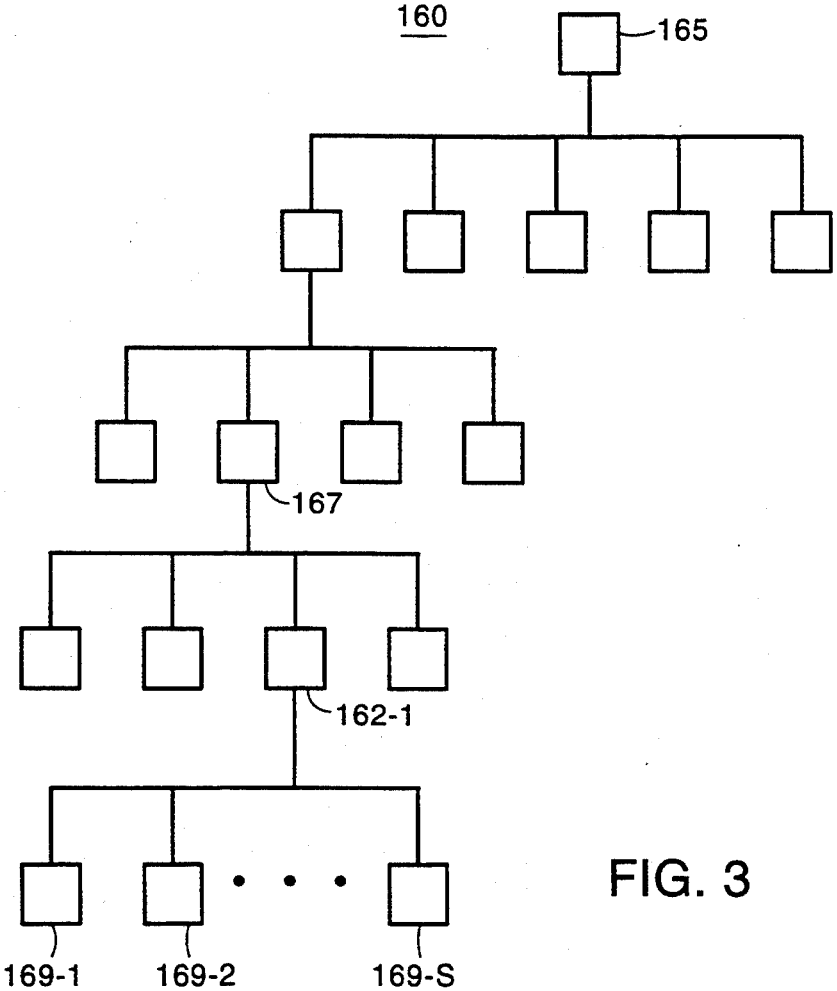
FIG. 2 is a schematic drawing of a data item in accordance with the invention.
FIG. 3 is a block drawing of a hierarchical data structure.

Referring now to FIG. 2, there is shown an exemplary arrangement of data item attributes. The data item attributes are, for example, name, data type, default size, class, superclass, subclass, a required flag, a modifiable flag, and a mapping parameter. The data items attributes are part of the logical model of the data model. The data item attributes are implemented in fields of data structures of the invention. The attributes are stored in fields 150-1, 150-2, ... 150-F for a data item 110-1, 110-2, 110-3, ... 110-N.

Field 150-1 contains the name attribute of the data item.

Field 150-2 contains the data type attribute. The data type states the type of data to be stored in the corresponding table data values 140. As set forth hereinabove with reference to table data values 140, the data type may, for example, indicate a single number or a single character. Or alternatively, a data type may indicate a two dimensional array of data such as a spread sheet. Or as a further alternative, a table data value may indicate an n-dimensional array of mixed types, where types includes characters, integers, floating point numbers, and so forth. As a still further alternative, a data type in field 150-2 may indicate an arbitrary data structure.

Field 150-3 contains the default size attribute. The default size indicates the amount of storage space needed to store the corresponding table data value 140.

Field 150-4 contains the class attribute, field 150-5 contains the superclass attribute, and field 150-6 contains the subclasses attribute. The class information contained in fields 150-4, 150-5, 150-6 specifies the data stored in corresponding table data value 140 in terms of a class hierarchy. The class hierarchy may be expressed as a class tree, as is more fully disclosed in FIG. 3, and is also more fully discussed hereinbelow.

A base class for the hierarchical data structure is a class having no superclass, but having subclasses, and in a special case may have no subclasses. A base class may, therefore, be identified by the contents of the super class field 150-5, and the contents of subclass field 150-6. Subclass field 150-6 is capable of referencing an indefinite number of subclasses. For example, the number of subclasses may vary between none and a large number. The subclass field 150-6 is arranged to point to a storage structure which may hold an indefinite number of subclass designations.

Field 150-7 contains a "data required flag" attribute. The "data required flag" indicates whether or not the table data value 140 is required when a corresponding scan line 130-1, 130-2, ... 130-M is stored. For example field 150-7 may be a single bit, and when the bit is "1" the corresponding table data value 140 is required, and when the bit is "0" the corresponding table data value 140 is not required. Alternatively, field 150-7 may be a more complex data structure than a single bit, and thus may contain additional information.

Field 150-8 contains a "data modifiable flag" attribute. The "data modifiable flag" indicates whether or not the user is permitted to modify the corresponding stored table data value 140. The invention provides an editor for the convenience of the user in modifying data stored in a data table 120-1, 120-2, ... 120-K, and the editor may, for example, read field 150-8 and change the setting of the "data modifiable flag". For example, the "data modifiable flag" contained in field 150-8 may be a single bit having a "yes" or a "no" interpretation. When the "data modifiable flag" is set to "yes", then the application can modify the data item, and in contrast when set to "no" the application cannot modify a data item after it is stored. Or for a further example, field 150-8 may be a more complex data structure than a single bit, and so may contain additional information such as permitting certain users to modify the corresponding table data value 140, while preventing users who have not been assigned modify privileges from modifying the data stored in the corresponding table data value 140.

Field 150-9 contains a mapping parameter attribute. The mapping parameter points to the storage location of the corresponding table data value 140 stored in a scan line of data. For example, the mapping parameter may contain the location in disk storage for the corresponding table data value 140, or alternatively may point to the first scan line 130-1 of data, and subsequent scan lines have the location of their table data value computed from the data type field 150-2, the default size field 150-3 and the mapping parameter 150-9 of other columns of the associated table. Alternatively, the mapping parameter may have a logical assignment that points to an external location such as another file, or another computer, or another network.

Referring now to FIG. 3, there is shown an exemplary hierarchical data structure 160. Data structure 160 is made up of tables of data arranged in class relationships, and organized into an overall tree data structure. A table 162-1 in the hierarchical data structure 160 is stored in accordance with the invention as a table 120-1, 120-2, ... 120-K. Each column of table 162-1 of hierarchical data structure 160 is defined by the corresponding data item 110-1, 110-2, ... 110-N of the configuration data structure 100. Each row of table 162-1 of hierarchical data structure 160 serves to store data from a corresponding scan line 130-1, 130-2, ... 130-M.

The class information for a table 162-1 in the hierarchical data structure 160 is contained in the corresponding data items 110-1, 110-2, ... 110-N, and is contained in the fields: class 150-4, superclass 150-5, and subclass 150-6. Referring now to exemplary table 162-1 of the hierarchical data structure 160: the base class is table 165 and is the apex of the tree data structure and so has no superclass; the superclass of table 162-1 is table 167, and is the class from which table 162-1 is immediately derived, and so is only one class; the subclass comprises an arbitrary number of classes represented by tables 169-1, 169-2, ... 169-S. The three data fields, class field 150-4, superclass field 150-5, and subclass field 150-6, when known for each table of hierarchical data structure 160 are sufficient to specify the entire hierarchical data structure 160.

ANALYTICAL CHEMISTRY DATA MODEL EXAMPLE

Figure 4:
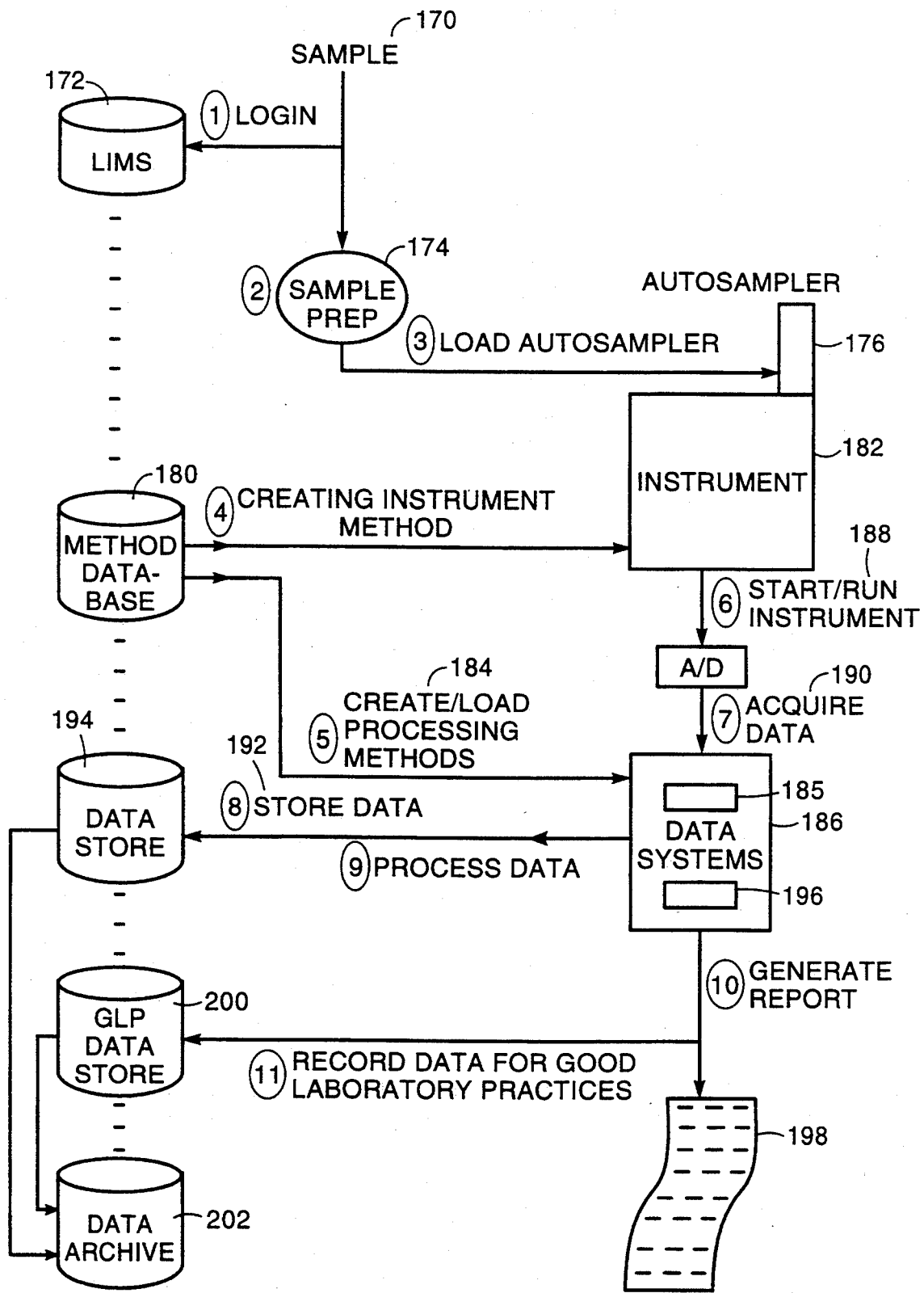
FIG. 4 is a flow diagram of data in an analytical chemistry measurement of physical or chemical parameters.

Referring now to FIG. 4, there is shown a flow diagram for processing of a sample in an analytical instrument, and for the processing of the data generated by operation of the instrument on the sample. At step 1, a chemical or physical sample is obtained from the physical world. For example, the sample may be an unknown for which it is desired to use the instrument to determine the chemical composition of the sample. Or for a further example the sample may be from a production process and it is desired to measure the amount of a material known to be contained in the sample. Or for a still further example, the sample may be a medical sample for which it is desired to measure the amounts of many substances by use of an instrument capable of measuring the amounts of several hundred different substances in the sample 170.

At step 1 login to a laboratory instrument management system 172 is accomplished. At the login step a user inputs to the database system the sample identification, the analytical measurement or measurements desired, the sample history, or any other relevant sample identification or measurement identification data.

At step 2 sample preparation 174 is accomplished. Sample preparation may mean placing a powder material in a glass or plastic container, dissolving a solid in a solvent, polishing a surface of a solid, diluting or concentrating a liquid sample, putting a gaseous sample into a convenient form, or any other useful physical or chemical preparation step.

At step 3 an autosampler 176 is loaded for the sample to be automatically brought into measurement position in the instrument.

At step 4 a method database 180 loads instructions into instrument 182. The instructions control instrument 182 so that instrument 182 performs the desired analysis on the sample. The use of method database 180 is particularly advantageous in the example wherein the instrument 182 is capable of performing many tests, and the desired test for a particular sample 170 is loaded into the computer system at step 1 into the laboratory instrument management system 172. The laboratory instrument management system 172, in response to the input provided at login step 1, causes the proper instructions to be loaded into instrument 182 at step 4.

At step 5 184 a data capture module 185 is activated in data systems 186. Then at step 6 188 the instrument is activated and the sample is measured. At step 7 190 the data is acquired by the data capture module 185 of data systems 186.

At step 8 192 the raw data from data capture module 185 is stored in a data store 194 database. Data processing module 196 of the data systems 186 then compute results from the measurement of the sample 170, at step 10 generate reports 198, and at step 11 store the results of computations to a data store database 200.

At a predetermined time, such as after processing a batch of samples, etc., the data from the samples is archived onto a permanent storage 202. For example, permanent storage 202 may be files on a fixed disk, may be written to a removable disk such as a floppy disk, or may be written to magnetic tape, or may be written to an optical storage device such as a write once read many WORM storage disk, or may be written to a magneto optical medium. The selection of permanent storage device is made with regard to the type of sample 170, the need for the data in the future, and the need for further processing steps for the data.

Figure 5:
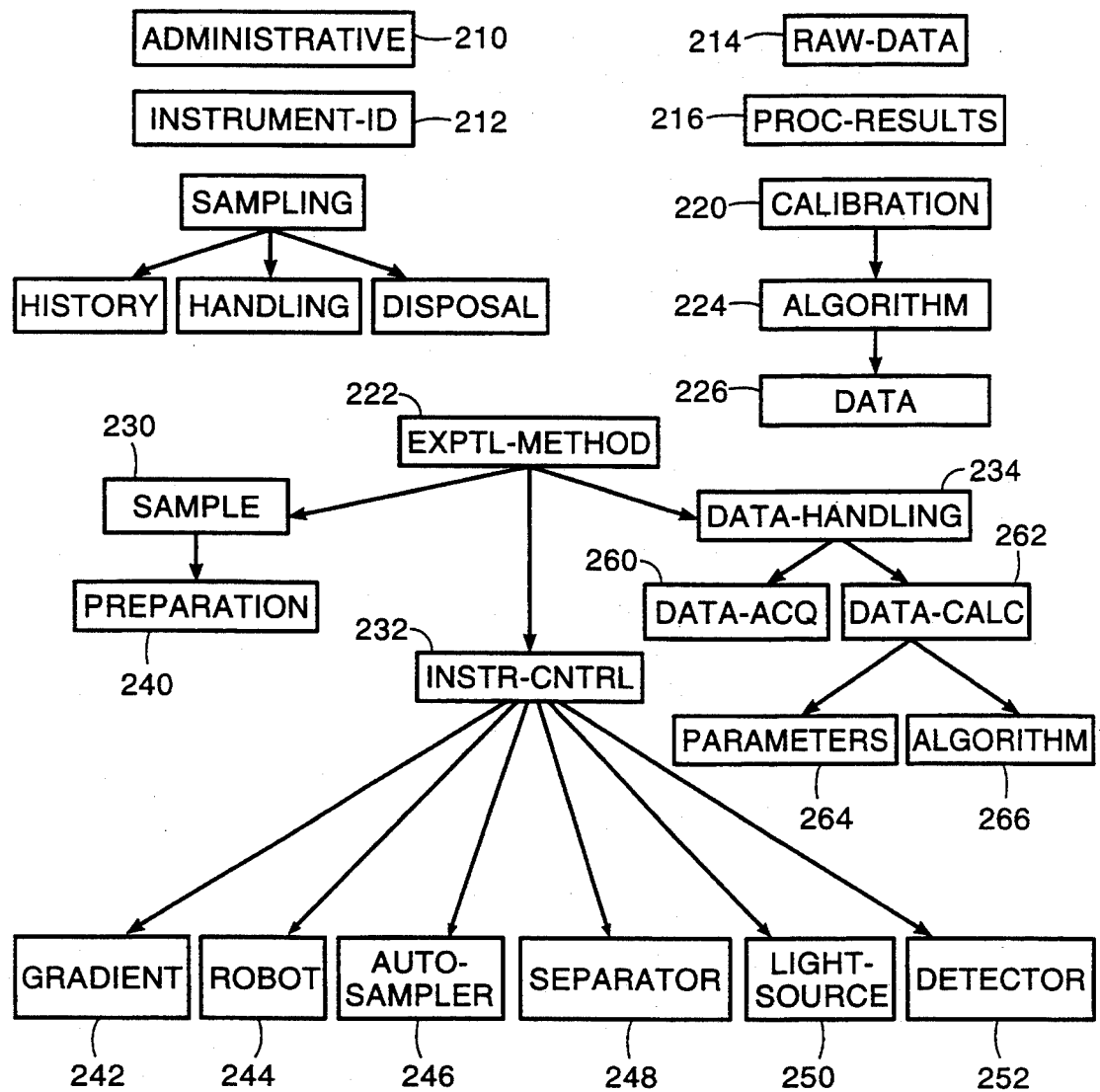
FIG. 5 is a data model for analytical chemical or physical data in accordance with the invention.

Referring now to FIG. 5, there is shown a hierarchical data model for use in handling the data storage requirements of the analytical physical and chemical data shown in the flow diagram of FIG. 4. Classifications of data shown in FIG. 5 which, for example, may apply to several data items, or for example, may apply to all data items, and are not shown with a subclass include: administrative 210; instrument identification 212; whether or not the data is raw data from an instrument 214; and, whether or not the data is the result of processing steps 216. Alternatively, the classifications of the instrument calibration 220, and the specification of the experimental method 222 apply to all data, and are shown as base classes for hierarchical data trees.

Instrument calibration 220 is a class, and has as subclasses the calibration algorithm 224. Representation of Calibration algorithm 224 as a subclass, although only one subclass block is shown in FIG. 5, represents the fact that an instrument may require several calibrations. And an algorithm may be chosen for each calibration. As a further example, a selected calibration may be accomplished in more than one manner, and so a subclass algorithm may be provided for each manner of accomplishing the selected calibration.

Data block 226 is a subclass of calibration algorithm 224. The subclass representation of data block 226 represents the fact that various categories of data must be stored for a calibration, and that data is conveniently divided into subclasses 226, where only one subclass block is shown.

The experimental method block 222 is a base class. A large number of experimental methods are available for analysis of samples, and include as exemplary methods:

chromatography such as gas, liquid, paper; mass spectrometry; optical absorption including visible, infrared, and ultra-violet; x-ray florescence; x-ray diffraction; optical fluorescence; gamma ray emission for radioactive samples; and many more exemplary experimental analysis methods.

Subclasses having the experimental method class 222 as the base class include, but are not limited by: a sample class 230; an instrument control class 232; and a data handling class 234.

For example a sample class may indicate whether the sample is a solid, liquid, or gas, if a solid were dissolved in some solvent, any concentration factors or dilution factors for the sample, etc. A group of sample preparation subclasses 240 aid in classifying sample preparation techniques.

For example, instrument control class 232 is shown with many different subclasses. Subclasses relevant to an instrument control class 232 include, but are not limited by: a gradient subclass 242 for instruments employing gradients such as concentration gradients, an electric field gradient in electroporesis, a gravity gradient in a centrifuge, or any other instrument using a gradient; a robot subclass 244 for any robot apparatus in the instrument 182 (FIG. 4); an autosampler control class 246; a separator subclass 248; a light subclass 250 to hold data defining the type of light source used in an instrument; and a detector subclass 252 for defining the detector used by instrument 182. Those skilled in the art of instrumental analysis will understand that the exemplary subclasses of the instrument control class 232 are merely illustrative of the plethora of types of instruments and the types of controls that are available to the analytical chemist, and that accordingly the subclasses set forth hereinabove are merely illustrative of the invention and are in no way limiting as to the classes of data accommodated by the present invention.

The data handling subclass 234, of the experimental method base class 222, is illustrated as having subclasses, data acquisition subclass 260 and data calculation subclass 262. Also, as exemplary further subclasses, data calculation subclass 262 serves as a superclass for the subclass parameters 264, and the subclass algorithm 266. The parameters subclass 264 and the algorithm subclass 266 define the analysis and computation performed on raw data collected from the instrument 182 of FIG. 4. Computations on raw instrument data are performed by modules 196 of data systems 186 as shown in FIG. 4, and are stored to data store 194.

The class structure of the exemplary hierarchical data structures illustrated in FIG. 5 may be fully defined by the data item 110-1, . . . 110-N fields: class 150-4; superclass 150-5; and subclass 150-6 illustrated in FIG. 2.

Storage of data generated by an instrumental analysis flow as illustrated in the exemplary flow diagram of FIG. 4, and the data having an exemplary hierarchical data structure as illustrated in FIG. 5, is greatly facilitated by the invention as illustrated in FIG. 1 and FIG. 2. The configuration data structure 100 defines the table layout of the data illustrated in FIG. 5, and the fields of each data item, as illustrated in FIG. 2, and fully characterizes all attributes of the data including the place in a hierarchical data structure used to organize the data. Further, in the event that it is discovered in the future that a different organization of the data is desirable, then a simple editing of the configuration data structure 100 will re-define the data model. And such an editing easily and simply re-organizes the storage of the data.

MODEL OF GENERIC CHROMATOGRAPHY DATA EXAMPLE

Referring now to FIG. 6-1 through FIG. 6-17, each figure is a table in an exemplary embodiment of the invention. The exemplary embodiment of the invention is a data model for a generic chromatography data arrangement. Each data item has, for example, a particular set of attributes such as, name, data type, default maximum size, class, superclass, subclass, and mapping parameter as shown in FIG. 2. In Tables 6-1 - 6-17 the attribute's: name 150-1, data type 150-2, and default maximum size 150-3 are illustrated for many data items.

Referring now to FIG. 6-1, there is shown Table 1, for ADMINISTRATIVE INFORMATION, and is, as an exemplary embodiment, representative of the information useful in administrative class 210 from FIG. 5. Table 1 contains 20 entries numbered 1 through 20. Further, Table 1 shows a "NAME" and a "DATA TYPE" for each entry. Each of the 20 named attributes of Table 1 corresponds to a column designated by the configuration data structure, such as column 120-1 of FIG. 1. Also, the group of 20 entries in FIG. 1, Table 1, are represented in the tables designated by configuration data structure 100 of 100, of FIG. 1. The corresponding data item, such as data item 110-2 of FIG. 1 contains information as shown in FIG. 2 characterizing the entries of Table 1. A scan line such as scan line 130-M of FIG. 1 is used to store a set of data in the corresponding Table, Table 1 of FIG. 6-1.

Some of the entries in the tables of FIG. 6-1-FIG. 6-17 are shown with representative dimensions, where the dimensions are number of assigned bytes, number and size of floating point words, etc. These representative dimensions were found to be satisfactory in a preferred embodiment of the invention, and further the representative dimensions are interpreted to be the maximum size allotted to the table entry. That is, blanks resulting from unused assigned dimension may be collapsed through use of dynamic string allocation in order to conserve computer storage. Again, the maximum size is a data item attribute which can be easily edited.

Referring now to FIG. 6-1, Table 1, Items 1-5 have DATA TYPE as a character array, and each is assigned 31 characters, as is represented by the symbol in the Table, [31]. Item 6 has the DATA TYPE floating-point [4], where the symbol [4] indicates that storage of this entry requires 4 bytes. Items 7-10 are also character arrays, but are of different byte size depending upon the storage needs for each entry. Items 11 and 12 are each extensible character arrays capable of receiving "n" successive data entries. That is, the data type 150-2 of FIG. 2 is chosen to be sufficiently general that "n" entries may be stored therein, and each successive entry is simply appended after the last entry.

Items 13 and 14 are each character arrays, items 15 and 16 are each integers, and item 17 is again an extensible data structure capable of receiving "n" successive entries. Also, item 17 is shown to have 255 bytes reserved for each entry. Items 18-20 are each character arrays, and each, in this exemplary embodiment, has reserved 63 bytes for data entry. Each of the DATA ITEMS as shown for example, data items 1-20 of Table 1, corresponds to a data item such as data item 110-2 of FIG. 1, and a corresponding column such as column 120-2 of FIG. 1. The beneficial attribute of the present invention which permits easy editing of the data model, permits an operator to easily change the number of entries in a particular table and thereby to easily change the storage arrangement within a computer holding the data. This easy editability of the data model makes the present invention ideally suited for storing data in a scientific field wherein the requirements of data storage are constantly changing as improvements are made in the scientific the field.

Referring now to FIG. 6-2, there is illustrated Table 2, SEPARATION EXPERIMENT TYPE. Table 2 shows some possible values for entry 14 in Table 1. Other separation types are also possible. Table 2 is shown with 10 data items. For example, the entries of Table 2 list various types of chromatography procedures used to take the data that is to be stored. For example, the various types of chromatography procedures could be presented on a menu, on a screen of a computer used by the person editing the data model, and the person simply selects the separation experiment for which they want to configure the data model. An advantage of the present invention is that as new chromatographic procedures are introduced, it is a simple matter to simply edit the configuration data structure 100 to add new data entries to the configuration data structure 100.

Referring now to FIG. 6-3, there is shown Table 3, INSTRUMENT-ID INFORMATION data class. For example there are illustrated 12 data entries, entries 1-12, in Table 3. Each data entry in Table 3 is given an NAME and a DATA TYPE. Items 1-12 are each illustrated as an assigned number of bytes for data storage. Item 12 is the current layered product version number, and each version number is recorded so a trail of all dependent layered products is recorded in order to accurately capture the version configuration of the software system. Item 12 provides an audit trail of software versions. Table 3 also contains other identification information for the instrument. An instrument may consist of many components, and so item 2 of Table 3, component type, stores information of the component whose model number is stored in item 5, and whose serial number is stored in item 6. For example, the component type may be an integer choice, as presented on a screen to an operator of the computer operating the system, and may be one of the following exemplary selections from a menu: 1. pump, 2. column, 3. detector, 4. gradient controller, 5. autosampler, 6. other injection device, 7. fraction-collector, 8. robot, 9. data system, 10. valve, 11. instrument interface, 12. degassing unit, 13. guard column, 14. end line filter, 15. column oven, 16. heaters, 17. other-device.

An advantage of the present invention is that this menu list of items may be extended, by editing the data model. Editing is accomplished by inserting a new column such as column 120-k of FIG. 1 in the event that other identification information in addition to the 11 items shown in Table 3, are found to be necessary in a future use of the data model.

Referring now to FIG. 6-4, there is shown CHROMATOGRAPHIC COLUMN-ID INFORMATION data class. There are 14 data items shown in Table 4, and these data items cover the important features necessary to describe a chromatography column. Again, an advantage of the present invention is that if it should become necessary in a future application to add another item of column identification information, the easy editability of the configuration data structure of FIG. 1, and corresponding addition of columns for data storage using a data model make the present invention ideal for storing chromatographic information.

Referring now to FIG. 6-5, there is shown GLOBAL-SAMPLE-ID INFORMATION data class in tables. Nine data items are shown for entry into Table 5, in the corresponding data class. For example, data entries of Table 5 are either character arrays of fixed length, or are integers, so for both character arrays and integers the data entries have fixed length reserved for their storage. However, in a further example, if it should become necessary in the future to increase the dimension of a character array used for one of the data items of Table 5, it would be very simple to increase that storage reserved for that data item by simply editing the configuration data structure 100, and change the default size 150-3 as shown in FIG. 2.

Referring now to FIG. 6-6, DETECTION-METHOD INFORMATION data class is shown in Table 6. For example, there are shown 12 data items, some of which are character arrays, some are integers, and some are floating point numbers. Again, as pointed out hereinabove, the present invention makes it very easy to add new data items, or to change the amount of storage reserved for any particular data item, by simply editing the configuration data structure 100 of FIG. 1.

Referring now to FIG. 6-7, there is shown Table 7, ADC-METHOD data class. Ten data items, for example, are shown having data types of character arrays, integers, floating point numbers, and floating point number arrays. For example, Item 5, ADC-START-TIME [CHANNEL] refers to an analog to digital converter. The experimental set up may have several channels of analog to digital converter. Each channel will have its separately defined starting time. The floating point number array illustrated for data item 5 provides a convenient means for storing the starting time of each analog to digital converter for each channel. Additionally, in the event that the number of channels were changed in a future revision of the instrumentation, the configuration data structure 100 could be edited to increase the size of a floating point array, and thereby accommodate the data requirements of the revised experimental system.

Figures 1, 7A:
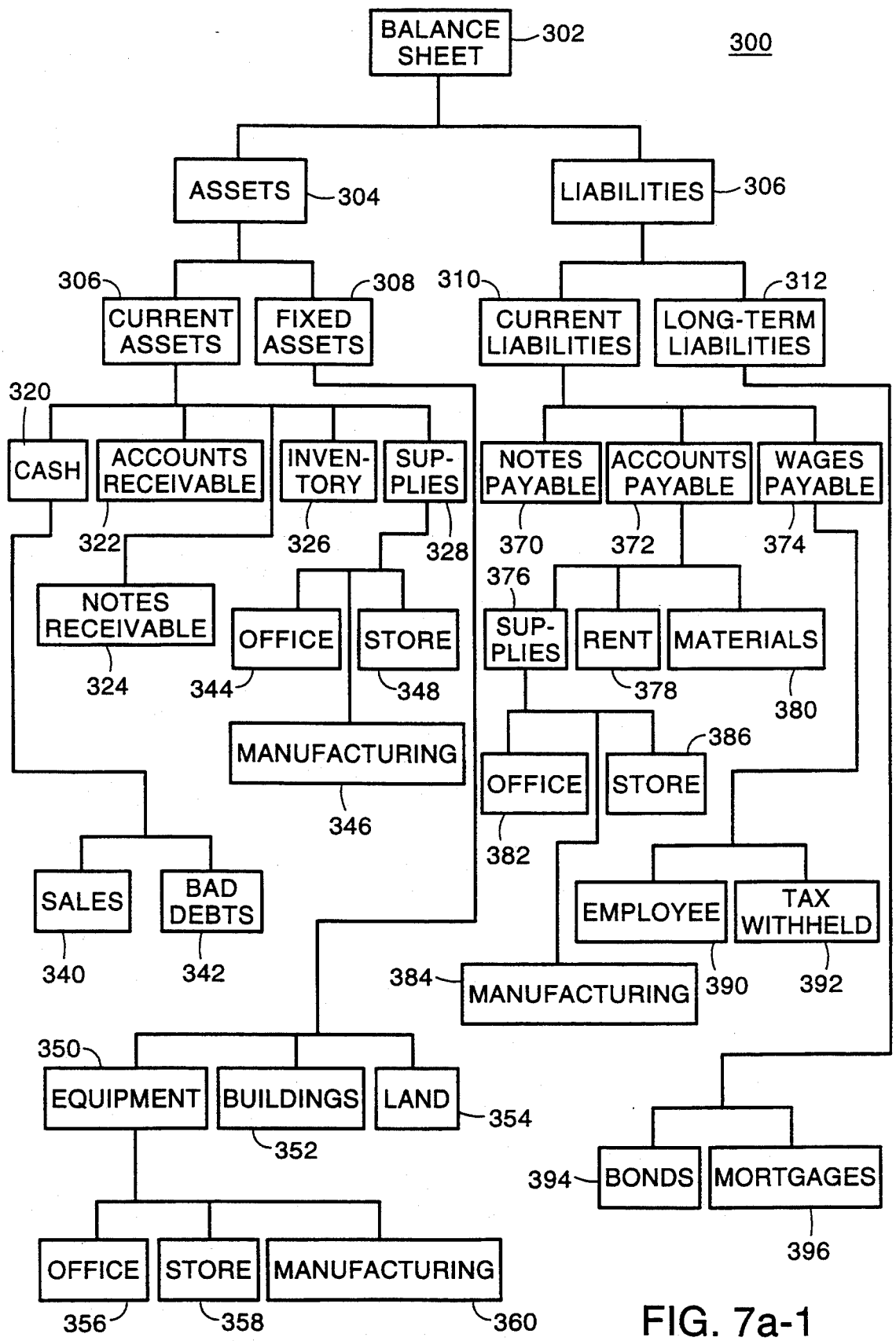
FIG. 7A, 7A (CONT), 7B, 7C are data classes for a financial data model in accordance with the invention.
Figures 2, 7A:
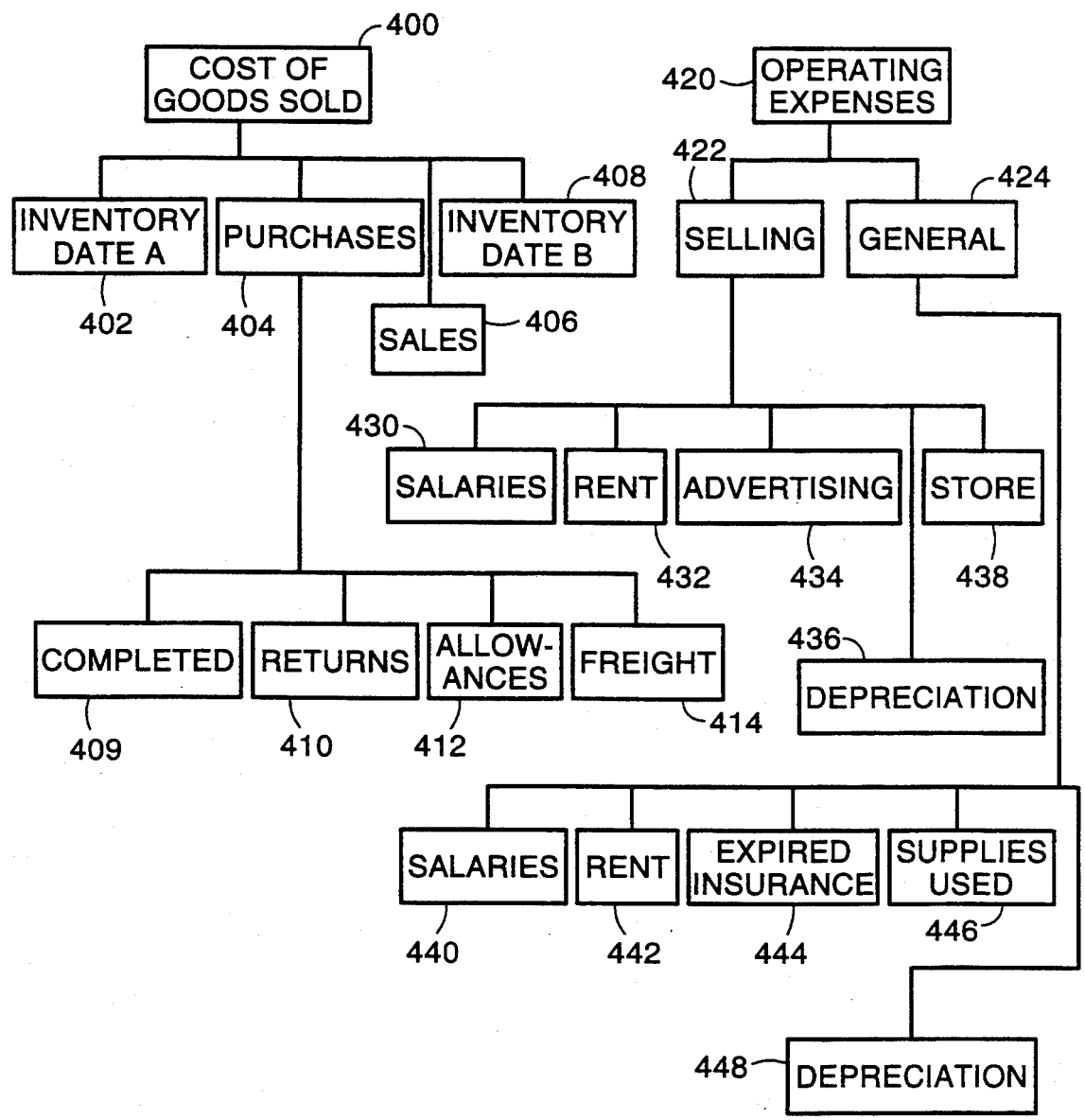
Figure 7B:
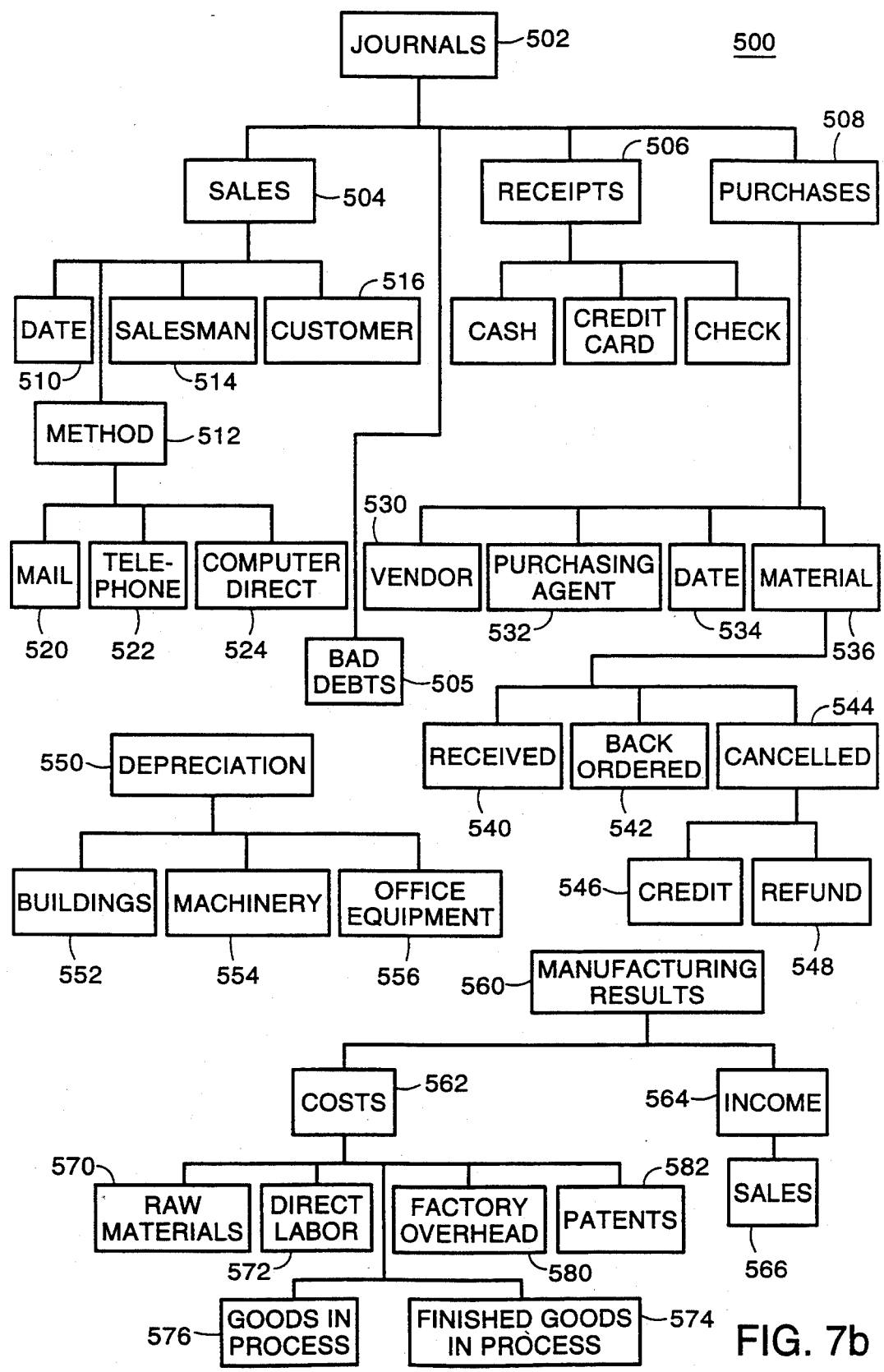
Figure 7C:
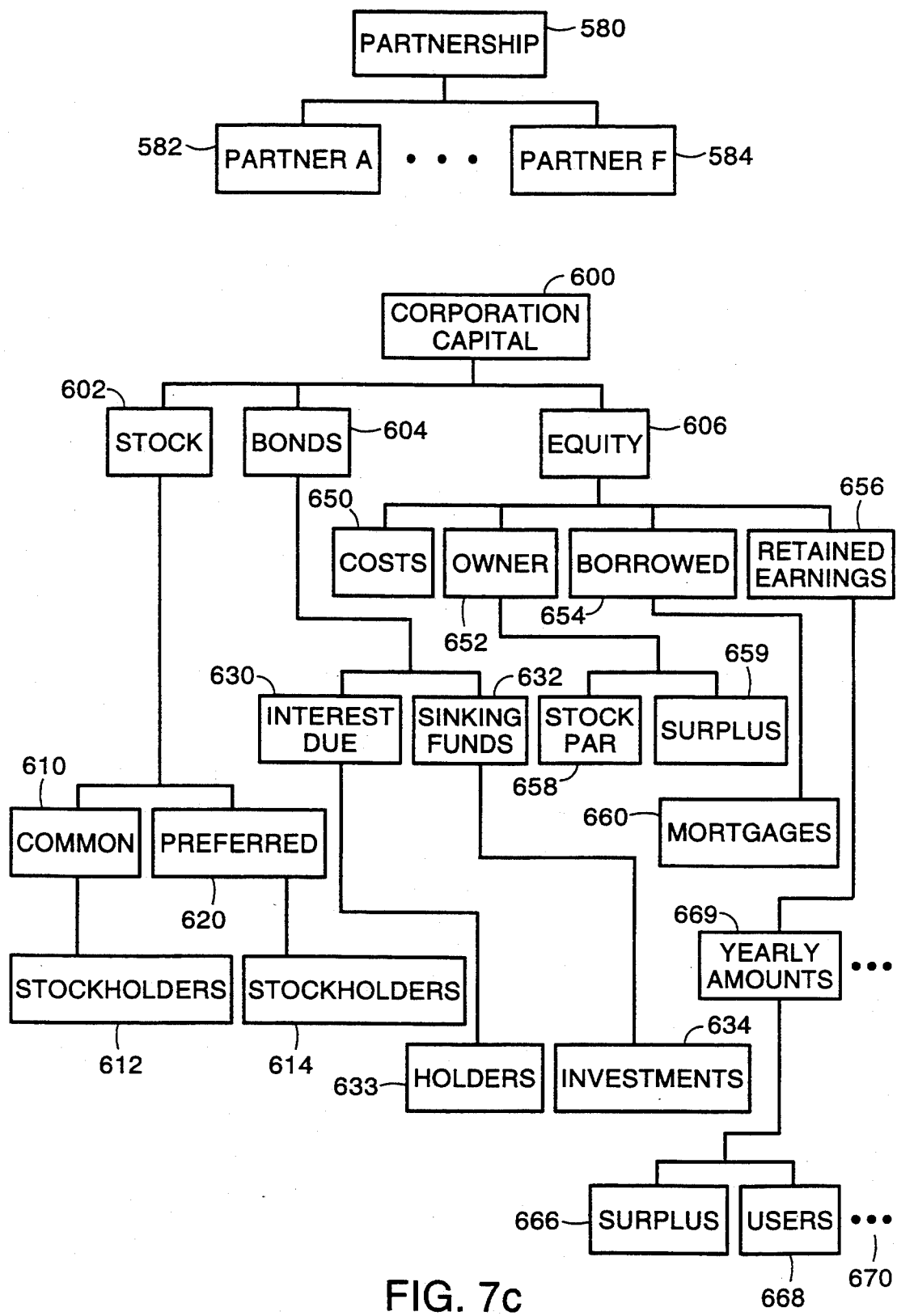
Figure 8:
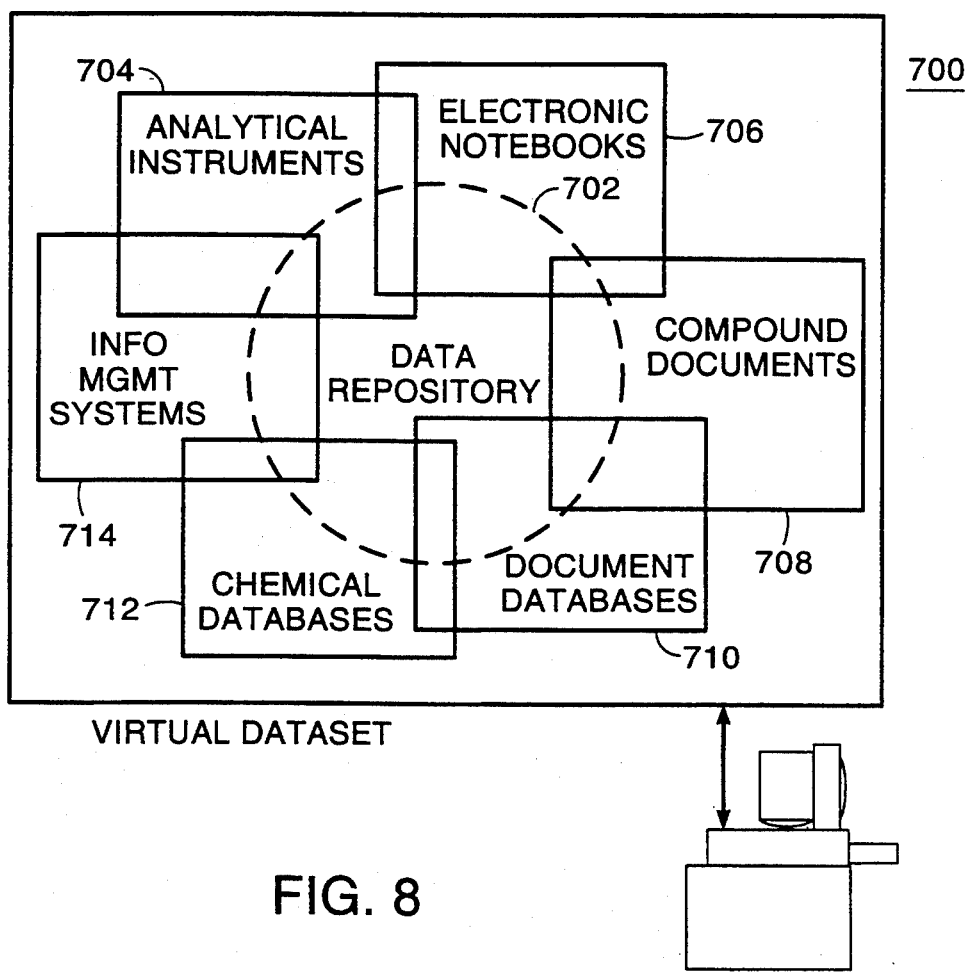

Referring now to FIG. 6-8, there is shown Table 8, RAW UNPROCESSED DATA, data class. Eleven data items are shown, having data types including integers, floating point numbers, boolean variable, and character arrays. Again, the eleven data items shown in Table 8 of FIG. 6-8 are chosen to conveniently conform to the experimental apparatus for which this data is being stored. The easy editability of the configuration data structure 100 makes it possible to accommodate changes in the data items necessary for a wide variety of experimental information.

Referring now to FIG. 6-9, there is shown Table 9, PEAK-PROCESSING-METHOD, data class. Twenty-three data items are shown, by way of illustrative example, as those data items necessary for describing computational methods used to process the data collected by the chromatographic instrument. The twenty-three data items that are shown include data types of character arrays, floating point numbers, and boolean variables. Some of the variables in FIG. 6-9, and also in other figures, include the symbols "[t]". The combination of symbols [t] mean that the variable is recorded as a function of time. The variable may be measured at different times, and the table data values stored after each measurement. The invention conveniently provides a means for storing values of a variable which change with time, and for storing values measured at various times. The value measured at the next time is simply stored in the next array element of the array stored within a cell of the table data structure shown in FIG. 1.

Referring now to FIG. 6-10, there is shown Table 10, PEAK-PROCESSING-RESULTS data class. Table 10, shows by way of illustrative example, 17 data items for recording the result of processing a peak from the chromatographic apparatus. Data types of these 17 items include character arrays, integers, and floating point numbers.

Referring now to FIG. 6-11, there is shown Table 11, INSTRUMENT CALIBRATION-METHOD INFORMATION data class. By way of illustrative example, there is shown 25 data items to record calibration data for the chromatographic instrument. Two of the data items, data item 6, Calibration Level Name [level], and data item 7 Curve Fit Equation [level] are extensible character arrays capable of receiving "n" successive data entries. Data items 6 and 7 may be extensible data structures stored at data value 140 of FIG. 1.

Referring now to FIG. 6-12, there is shown Table 12, MULTICOMPONENT SAMPLE CALIBRATION METHOD data class. Table 12 contains data necessary for the analysis of the output of the chromatographic instrument, and contains data types including character arrays, floating point numbers, integers, and floating point arrays. Again, easy editing of the configuration data structure 100 provides, by the present invention, convenient means for storing data necessary for analyzing scientific information. As conditions change in the future, and developments proceed in the ordinary course of research and development, new data may become necessary for the analysis of instrument output. Simple editing of the configuration data structure 100 provides a means for allocating storage for any additional needed data.

Referring now to FIG. 6-13, there is shown Table 13, RESULTS FROM MULTICOMPONENT SAMPLE CALIBRATION METHOD data class. This data class is provided to give storage space for data relating to sample components from a chromatographic instrument, as needed in a particular case.

Referring now to FIG. 6-14, there is shown Table 14, SAMPLE SEQUENCE RUN data class. Table 14 shows, by way of illustrative example, 33 data items of various data types. The data items of Table 14 are chosen to describe that information necessary for handling sequenced runs of many samples through a chromatographic instrument. As is well known to those skilled in the art of the use of chromatographic instruments, it will be recognized that many elements of data are necessary in order to maintain control of a large number of samples, when these samples are placed in a sequence to run automatically in a chromatographic instrument. Again, the easy editability of the configuration data structure 100 shown in FIG. 1 permits adding new data items to Table 14, changing the size of a data structure of data value 140 of FIG. 1 as needed to store each of the data items, and to otherwise edit and change the data items as needed in a particular application.

Referring now to FIG. 6-15, there is shown in Table 15, DIMENSIONS OF VARIABLES. In Table 15 there are shown 15 data items, by way of illustrative example, and these data items are chosen to define the dimension attributes used by variables in the other tables. The dimension attributes define the size of arrays used to define, and to index, the quantities mentioned in the other tables.

Referring now to FIG. 6-16, there is shown Table 16, INSTRUMENT-CONTROL EVENTS data class. An instrument has many controls, and the nine data items set forth in Table 16, are, by way of illustrative example, a class of data items needed to define the control settings of the instrument. Data types include character arrays, floating point numbers, boolean variables, and floating point arrays that are extensible. The extensible floating point arrays may, for example, use an extensible table data value 140 as illustrated in FIG. 1. Or, by way of further example, the extensibility of the array may be achieved by data storage in successive scan lines, scan line 130-M as illustrated in FIG. 1.

Referring now to FIG. 6-17, there is shown Table 17, REPROCESSING-METHOD data class. Table 17 illustrates a class of data conveniently selected for describing a reprocessing run for a sample, where that sample has had previous experimental runs on the chromatographic instrument. Data types for the 19 data items illustrated, by way of example, in Table 17 include character arrays, boolean variables, floating point numbers, and integers.

The hierarchical relationships between the various data classes shown in FIG. 6-1 through FIG. 6-17 may be maintained by the corresponding fields of the corresponding data item 110-1 of FIG. 2. Each data item 120-1 of the corresponding configuration data structure for the classes of FIG. 6-1 through FIG. 6-17 contains corresponding class fields 150-4, 150-5, and 150-6. Class field 150-4, superclass field 150-5, and subclass field 150-6 may be used to define a hierarchical data structure for the chromatographic data classes shown in FIG. 6-1 through FIG. 6-2, where the chromatographic hierarchical data structure corresponds to illustrative hierarchical data structure 160 of FIG. 3.

As will be recognized by those skilled in the art of the use of chromatographic instruments, data items necessary for a particular instrument for a particular purpose may not have been illustrated in FIG. 6-1 through FIG. 6-17. However, the easy editing capability provided by the configuration data structure 100 makes the present invention ideal for those situations. That is, additional data items recognized as being needed by a skilled chromatographic operator may simply be added to the database by editing the configuration data structure 100.

FINANCIAL DATA MODEL EXAMPLE

Referring now to FIG. 7A, FIG. 7B, and FIG. 7C, there is shown a hierarchical tree structure for a financial data model. In accordance with the invention as set forth in FIG. 1, FIG. 2, and FIG. 3, the hierarchical financial data model of FIG. 7A, FIG. 7B, and FIG. 7C may be conveniently represented as described hereinbelow.

The financial data model is represented as a general hierarchical structure 300 along with several additional hierarchical structures which are outside, but are related to, the hierarchical structure 300.

Referring now to hierarchical structure 300, the Base Class Balance Sheet 302 has two major subclasses, Assets 304 and Liabilities 306.

Assets Class 304 has two subclasses, Current Assets 306 and Fixed Assets 308. Further, Liabilities Class 306 has two subclasses, Current Liabilities 310 and Long-term Liabilities 312.

Referring now to the subclasses of Current Assets Class 306, there are included Cash Class 320, Accounts Receivable Class 322, Notes Receivable Class 324, Inventory Class 326, and Supplies Class 328.

Referring now to Cash Class 320, there are shown two subclasses, Sales Class 340, and Bad Debts Class 342.

Referring now to Supplies Class 328, there are shown as subclasses, Office Class 344, Manufacturing Class 346, and Store Class 348.

Referring now to Fixed Assets Class 308, there is shown, by way of example, Equipment Class 350, Buildings Class 352, and Land Class 354.

Referring now to Equipment Class 350, there are shown the following subclasses, Office Class 356, Store Class 358, and Manufacturing Class 360.

Referring now to Liabilities Class 306, and the two exemplary subclasses shown therein, Current Liabilities 310 and Long-term Liabilities 312, there are shown subclasses for the current Liabilities Class 310. Subclasses of Current Liabilities 310 include, by way of example, Notes Payable 370, Accounts Payable 372, and Wages Payable 374.

Referring now to Accounts Payable Class 372, there are shown the following subclasses, Supplies 376, Rent 378, and Materials 380.

Referring now to the Supplies Class 376, there are shown subclasses, Office 382, Manufacturing 384, and Store 386.

Referring now to Wages Payable Class 374, there are shown the following subclasses, Employee 390 and Tax Withheld 392.

Referring now to the Long-term Liabilities Class 312, there are shown the following subclasses, Bonds 394 and Mortgages 396.

The hierarchical financial data model structure 300 is shown by way of example, as those skilled in the art of financial data structures may easily add additional subclasses to the classes shown, and may also add additional classes at each node in the hierarchical tree, for the additional classes take into account the peculiarities of a particular business organization.

A supplementary hierarchical structure is shown having a base class Cost of Goods Sold 400. The Cost of Goods Sold 400 hierarchical structure provides a mechanism by which a business may keep track of the cost of goods that the business sells, as is well known by those skilled in the art of financial data models. The Cost of Goods Sold Class 400 has subclass Inventory at Date A 402, subclass Purchases 404, Sales 406, and Inventory at Date B 408. Purchases Class 404 is, by way of example, broken down into the subclasses Completed 409, Returns 410, Allowances 412, and Freight 414.

Another supplementary hierarchical structure in the financial data model includes Operating Expense 420 as a base class. Both classes for Operating Expense Class 420 include, by way of example, Selling Class 422, and General Class 424.

Referring now to Selling Class 422, there are shown by way of illustrative example, subclasses Salaries 430, Rent 432, Advertising 434, Depreciation 436, and Other 438.

Referring now to General Class 424, there is shown, by way of illustrative example, the subclasses as follows, Salaries 440, Rent 442, Expired Insurance 444, Supplies Used 446, and Depreciation 448.

Supplemental to the financial model, there is shown in FIG. 7B, a journal hierarchical structure 500. The base class is Journals Class 502. Journal base Class 502, has as subclasses, by way of illustrative example, Sales 504, Bad Debts 505, Receipts 506, and Purchases 508. The classes Sales 504, Receipts 506, and Purchases 508, represent the ordinary and usual journals maintained by a business in keeping track of its internal functioning, as is well known to those skilled in the arts of financial management.

Referring now to Sales Journal Class 504, there are shown subclasses Date 510, Method 512, Salesman 514, and Customer 516. For example, the Date Class 510 may contain all sales made on a particular date, arranged by date. The Salesman Class 514 may contain sales made by each salesman and, for example, be arranged alphabetically by the salesman's name. The Customer Class 516, may list all sales as made to particular customers, and may, for example, be ordered alphabetically by the customer's name.

Referring now to the Method Class 512, sales may be made by various methods as shown, for example, in Mail Class 520, Telephone Class 522, Computer Direct Orders 524, or by other sales methods which could be represented by other classes, as those skilled in the art of financial management are aware.

Referring now to Purchases Class 508, the following subclasses are shown, by way of illustrative example, Vendor Class 530, Purchasing Agent Class 532, Date Class 534, and Material Class 536. For example, purchases may be arranged by the vendor supplying the purchased materials or services in Vendor Class 530. Purchases may be arranged in accordance with the purchasing agent by Class 532. Purchases may be arranged by the date on which the purchases were made, in accordance with Date Class 534.

Referring now to Material Class 536, the fate of the materials purchased may be ordered by subclasses, Received 540, Backordered 542, and Canceled Class 544.

Referring now to Canceled Class 544, purchases may be broken down into those for which credit was received in Credit Class 546, and those for which a refund is obtained in Refund Class 548.

An ancillary hierarchical structure useful in financial management is shown with Depreciation base Class 550. Depreciation base Class 550 represents the elements of the business for which depreciation, for example, for tax purposes, may be recorded. Depreciation Class 550 has as subclasses, Buildings Class 552, Machinery Class 554, and Office Equipment Class 556.

An additional ancillary hierarchical structure has a base class of Manufacturing Results 560. Subclasses for Manufacturing Results include Costs 562 and Income 564. For example, the Manufacturing Results Class 560 may be maintained by a business for each factory, each division, or each subsidiary involved in a manufacturing operation. In that event, each such structure could have its own base class as represented by Manufacturing Results Class 560.

Referring now to Income Class 564, there is shown, by way of illustrative example, Sales subclass 566.

Referring now to Costs Class 562, there are shown, by way of example, Raw Materials Class 570, Direct Labor Class 572, Finished Goods Inventory Class 574, Goods in Process Class 576, Factory Overhead 580, and Patents 582. As those who are skilled in the arts of financial management are aware, additional, useful, and important subclasses may be broken out in a hierarchical tree structure such as shown for Base Class Manufacturing Results 560.

Referring now to FIG. 7C, there is shown a capital structure for a partnership, having a Partnership Base Class 580. Subclasses for the Partnership Base Class 580 are shown, by way of example, as a class for Partner A of 582 and a class for Partner Z of 584, for classes 582 and 584 serve to illustrate a subclass for each partner having a partnership stake in the business.

There is shown also in FIG. 7C a capital structure for a corporation having a Corporation Capital base Class 600. Subclasses for the corporation capital structure are shown as, Stock Class 602, Bonds Class 604, and Equity Class 606.

Referring now to Stock Class 602, there is shown Common Stock Class 610 having a subclass of Stockholder List 612, and a further subclass of Class Stock 602 as Preferred Stock 620, the Preferred Stock Class having a subclass of Stockholders 614.

Referring now to Bonds Class 604, there is shown an Interest Due Class 630, and a Sinking Funds Class 632. As a subclass of Interest Due Class 630, there is shown a Holders Class 633. As a subclass of Sinking Funds Class 632 there is shown an Investments Class 634.

Referring now to Equity Class 606, there are shown the following subclasses, Cash 650, Owner 652, Borrowed 654, and Retained Earnings 656.

Referring now to the Owner Class 652, there are shown subclasses Stock Par Value 658, and Surplus 659.

Referring now to Borrowed Class 654, there are shown a Mortgage subclass 660 for mortgages securing the borrowings of Borrowed Class 654.

Referring now to Retained Earnings Class 656, there are shown subclasses Yearly Amounts 664. Subclasses Yearly Amounts 664 may be utilized in the data model, for example, for each year of the corporate existence, and will reflect a history of retained earnings.

Referring now to Yearly Amounts Class 664, there is shown subclass Sources 666 and Uses Class 668. Also, there is a Sources Class 666 and a Uses Class 668 for each of the Yearly Amounts Class 664, as is shown by the three dots 670.

The hierarchical data structures set forth in FIG. 7A, FIG. 7B, and FIG. 7C may conveniently be represented by the data model as set forth in FIG. 1, FIG. 2, and FIG. 3. For example, the configuration data structure 100 may be edited to represent all of the classes and subclasses, shown by way of example, in the financial model, as shown in FIG. 7A, FIG. 7B, and FIG. 7C. Each of the base classes and the subclasses of the financial data model may be represented by tables, as needed by each specific class, as shown in FIG. 1. For example, a particular subclass such as Assets Class 304 may be represented by Table 1, 120-1. The data items from the configuration data structure 110-1 and the corresponding column 110-1C, of Table 1, may represent a first entry in Assets Class 304. Data item 110-2, and a corresponding column in 110-2C in Table 1, may represent a second entry in Assets Class 304. Accordingly, all of the data classes set forth in the various classes and subclasses of the financial data model, may be represented by data items in the configuration data structure, and the corresponding columns of the corresponding data tables.

The corresponding data items in the tables are not shown herein for the sake of brevity. The data items for the tables are, for example, the ordinary line items used in accounting practice. Reference may be made to an accounting textbook for representative line items for each of the tables set out in FIG. 7A, FIG. 7B, FIG. 7C.

Scan Lines 130-1, 130-2, . . . 130-M contain data items such as, for example, data item 140. Data for a particular table, and for a particular set of entries, is stored in a corresponding scan line. Each next set of data is stored in the next scan line. Thus, a table may contain any number of data sets, each stored in a particular scan line.

A data item 140 may be chosen to be of a type (FIG. 2 Data Type 150-2) as is convenient for storing the corresponding data. For example, data item 140 may be a single integer number, may be a decimal number representing dollars and cents, or may be an entire spreadsheet holding a two-dimensional array of numbers and characters, or may be any arbitrary data structure as discussed hereinabove with reference to FIG. 1.

Referring now to FIG. 2, where there is shown a representative data item 110-1, the financial data model data items may be conveniently represented thereby. For example, the data item Name 150-1 gives the name of a particular entry into Assets Class 304. The data Type 150-2 gives the type of data that is necessary for storing the particular data entry. The default Size 150-3 gives the size of a data structure needed to store this particular entry of Assets Class 304. The Base Class 150-4, in this particular example, gives for the Assets Class 304, the Base Class Balance Sheet Class 302. The Class entry 150-5 gives the Assets Class 304. The subclass entry 150-6 lists the subclasses of Assets Class 304, Various Current Assets Class 306, and Fixed Assets Class 308. The Required Flag 150-7 shows where the particular class is required in the financial data model. The Modifiable Flag 150-8 may have a structure which permits certain personnel to modify the Assets Class 304, or prevent any other personnel from making a modification of the data. The Mapping Parameter entry 150-9 is a pointer into the storage of the data represented by data item 110-1. The data is, for example, stored on a disk, and Mapping Parameter entry 150-9 is structured so as to permit the process to easily find the data on the disk.

As an alternative to storing data on a disk that is local to the computer, the data may be stored at a convenient location on a network, where the network is a computer communications network. The data is then stored at a remote location using a magnetic disk, an optical storage device, ROM, RAM, or other convenient computer storage medium. In all cases, the mapping parameter provides a pointer to the data.

The various segments of the financial data model are well represented by the basic structure of the hierarchical structure 160 shown in FIG. 3. Accordingly, the general discussion given hereinabove relating the data model structure of FIG. 1 and FIG. 2 to the hierarchical structure of FIG. 3 is fully applicable to the financial data model.

An advantage of modeling financial data in accordance with the present invention is that the configuration data structure 100 may be easily edited. Thus, if a change in financial practices necessitates a change in accounting structure, the financial data model may easily accommodate the changed accounting structure by a simple editing process. The simple editing process simply adds, subtracts, or modifies the location of data items such as Data Item 110-1. Or, as a further example, editing of the data items may shift the data item from a table such as Table 1 to another table such as Table 120-K. Accordingly, the process of changing financial accounting methods and structures is easily accommodated by the present invention. The easy editability of the configuration data structure contributes greatly to the convenience of the present invention in maintaining, in the face of changing financial requirements in a business, the financial data model used by that business.

DATA INTERCHANGE MODEL EXAMPLE

Referring now to FIG. 8, there is shown a virtual data set 700. Central to the virtual data set 700 is a data repository 702. The data repository 702 holds data that is used by a variety of applications, including analytical instruments 704, electronic notebooks 706, compound documents 708, document data bases 710, chemical data bases 712 and information management systems 714.

Data repository 702 holds data that is accessible to all of the applications, 704, 706, 708, 710, 712, and 714. Data is stored in data repository 702 in accordance with the invention, and utilizes the configuration data structure 100 as shown in FIG. 1. The data in data repository 702 is stored along scan lines, such as scan line 130-M, in tables conveniently arranged to hold the data set. For example, in the event that analytical instruments 704 are chromatographic type instruments, the data stored in data repository 702 may be arranged in accordance with the examples shown in FIG. 6-1 through FIG. 6-17. Further, in the event that the data repository 702 contains data of a financial nature, and the applications are of the sort which uses a corporate financial data base, then again, the data stored in data repository 702 is stored in accordance with the invention through a configuration data structure 100 as set forth in FIG. 1. Further, the data in the various classes of the financial data model are set forth in convenient tables, as described herein above, and are described by data items such as are shown in FIG. 2.

The convenience of a data model for applications, such as application 704, . . . 714, is that the data model allows access to the data in a very convenient manner by the applications. Each application is written to access data items in the various tables, as set forth in the configuration data structure. The applications are made to be editable along with the editing of the configuration data structure 100, so that as changes are made to the format of data in data repository 702, the applications have equivalent changes made therein so that they may continue to conveniently access data in data repository 702. For example, data stored under a previous edit may be rewritten to conform to the new field structure defined by a new edit of the data model.

The data model used with the invention is determined by the application. The virtual instrument data model may be conveniently employed for chromatographic data. For example, in the chromatographic data model disclosed hereinabove, analytical instruments 704 applications, chemical data bases 712, will be the most likely convenient application. Alternatively however, a financial and business data model may be conveniently employed for appropriate applications. For example, in the event that data repository 702 stores financial data in accordance with the financial data model disclosed hereinabove, the information management systems application 714, and document data base 710 may become, for example, the most used applications.

Applications such as electronic notebooks, electronic document preparation, and document data bases 710 prove to be useful in both scientific data and financial data, or other corporate management type data.

Figure 9:
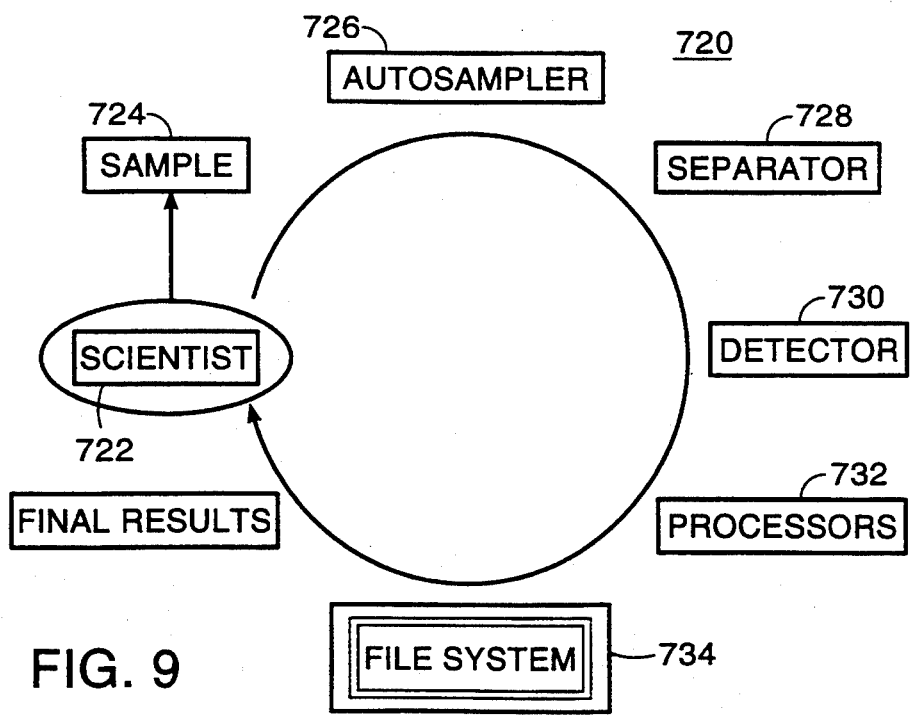

Turning now to FIG. 9, there is shown a representation of a generic scientific instrument 720. The model of the generic instrument set forth in FIG. 720 includes, first a scientist, 722 who uses the instrument. The scientist obtains a sample of material to be tested on the instrument, prepares it for testing, and inserts it into the instrument.

Sample 724 is prepared by the scientist for analysis by the generic instrument. After the sample has undergone whatever chemical preparation, physical preparation, or whatever type of preparation, the sample is placed in an auto sampler 726. Auto sampler 726 carries the sample into the generic instrument for analysis.

In the first stage of analysis, separator 728 separates the sample into component parts. For example, a gas chromatograph uses the chromatographic column to separate a sample containing a mixture of unknowns into component parts containing substantially pure samples of each unknown. As a further example, a mass spectrometer separates a sample by an electromagnetic field process, so that separated samples may then, for example, be used as input samples to a gas chromatograph.

Detector 730 detects the separated components of the sample. Characteristics of the separators are calibrated so that output of the detector 730 may, for example, be interpreted to identify the chemical nature of a separated portion of sample 724. As a further example, detector 730 may be an ultraviolet spectrometer, an infrared spectrometer, a magnetic resonance spectrometer and so forth. Each of these detectors has a method for identifying components of sample 724.

Data from detector 730 is delivered to processor 732. Processor 732 may be software operating in a computer for analysis of the data produced by detector 730.

File system 734 is used to hold data generated, for example, by the generic instrument. The file system contains administrative data, technical data, output data from the instrument, and results computed by processors.

Also a final result, based upon analysis by the scientists of the output of the generic instrument, may be collected and stored in file system 734.

Figure 10:
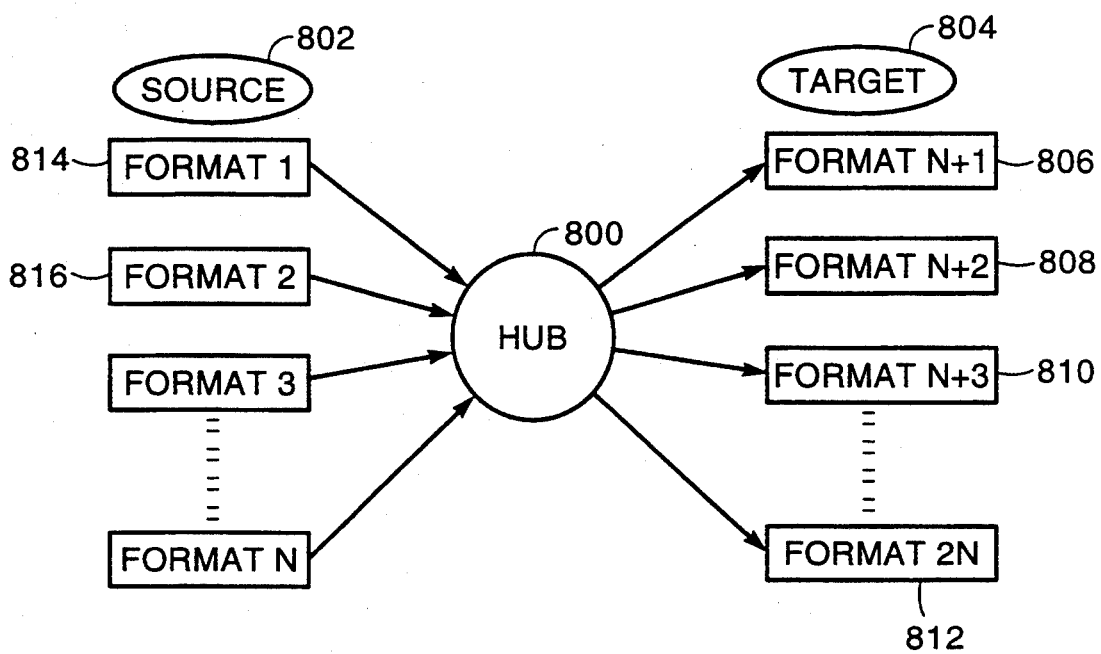

Turning now to FIG. 10, there is shown a data converter for converting data in a first format into data in a second format. Hub 800 serves as a transmission point between a source 802, in a first format, and a target 804 requiring data in a second format. For example, with reference to the generic instrument of FIG. 9, the source could be a software module that receives and stores data acquired by detector 730 and the target could be the processors 732. For example, a particular detector 730 may be made by one manufacturer and have its unique software data acquisition software module, and there may be a number of processors 732 made by a number of manufacturers which are useful for analyzing data of the type produced by detector 730. As those skilled in the art of chemical data processing will readily understand, if there are a number of processors 732 made by different manufacturers, each processor will probably require its data in a different format. For example, if processor 732 is represented by target 804 and a first processor is made by a first manufacturer then it may require format N+1 806.

As a further example, with processor 732 represented by target 804, and processor 732 made by another and different manufacturer, that processor may require format N+2 808. And, for example, further useful processors, each made by a different manufacturer, may require a different format such as format N+3 810 through a different format such as 2N 812, depending upon the number of processors available to deal with the data produced by detector 730.

Alternatively, there is available one processor 732, and processor 732 as represented as a target 804, and there are available a number of different detectors 730 capable of producing data from samples 724, the detectors 730 may be represented by source 802. A processor for a detector 730 made by a first manufacturer may produce data in format one 814, or if made by a different manufacturer may produce data in format two, 816, and so forth through a different format for data produced by each processor produced by each different manufacturer. In the event that there are N sources and N targets, there will need to be N * (N−1)/2 converters.

Figure 11:
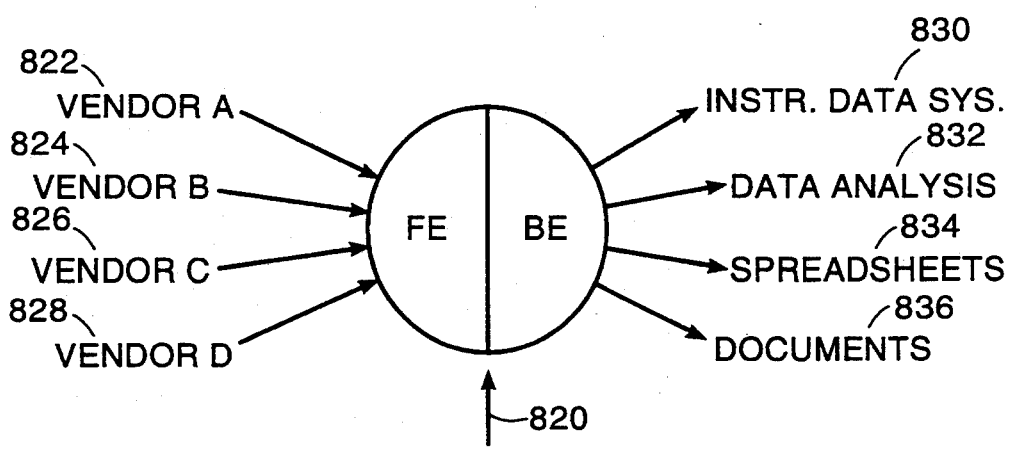

In accordances with the present invention, the number of needed converters is greatly reduced. Referring now to FIG. 11, there is shown a converter hub having a data interchange and storage model 820. Data in data interchange and storage model 820 is stored in accordance with the configuration data structure 100 shown in FIG. 1, and its corresponding tables and columns. Sources of data, represented by vendor A 822, vendor B 824, vendor C 826, and vendor D 828, are all converted to the format of the invention as set forth in the configuration data structure 100, and stored in data interchange and storage model 820. Vendors A, B, C, D represents different manufacturers of scientific instruments. Targets for the data stored in data interchange and storage model 820 are represented by instrumental data system 830, data analysis module 832, spread sheet module 834 and documents 836 for reporting results of the experimental activities. The number of data converters necessary for utilization of a hub with sources of data and targets to use the data as set forth in FIG. 10, is reduced to simply one converter for each source and one converter for each target, rather than the product of the number of sources and the number of targets.

The present invention, utilizing the configuration data structure 100 shown in FIG. 1, greatly facilitates the interchange of data between a number of potential data sources and a number of potential targets for which it is desired that the data produced by each source, be utilized.

Figure 12:
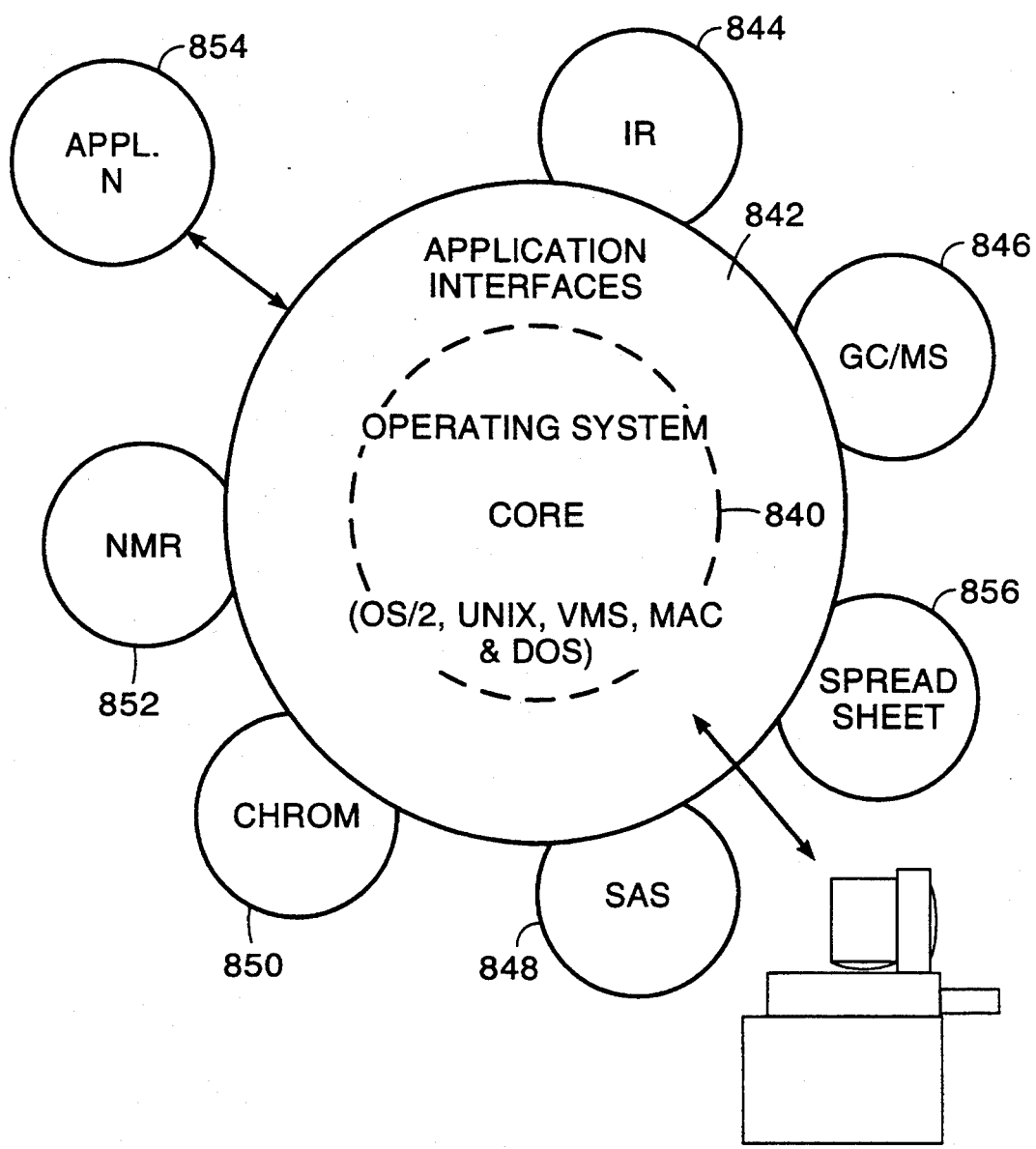

Referring now to FIG. 12, there is shown in accordance with the invention, a computer operating system core 840. For example, computer operating system core 840 may be a VMS operating system as sold by Digital Equipment Corporation, may be a UNIX operating system as is distributed by American Telephone & Telegraph Company, may be an OS/2 operating system such as is distributed by International Business Machines Corporation, may be a Macintosh operating system as is distributed by Apple Computer, Inc., or may be a DOS operating system, as for example, distributed by Microsoft Corporation.

Operating in a level above the operating system is the application interface 842. Application interface 842 utilizes the present invention using the configuration data structure 100 as shown in FIG. 1. The configuration data structure is available to computer programs serving as application program modules for various sources 802 and targets 804 for data. For example, infrared spectrometer data applications module 844 stores data from infrared spectrometers through application interface 842. Gas chromatograph mass spectrometers 846 have applications modules utilizing application interface 842, and store data in the format of the invention utilizing configuration data structure 100 of FIG. 1 through application interface 842.

A data analysis program well known to those skilled in the art of chemical data analysis is referred to as Statistical Analysis Software (SAS), and is produced by the SAS Institute located in Research Triangle Park, North Carolina. The SAS system 848 has application modules to application interfaces 842. The SAS system 848 utilizes and analyzes data stored in application interfaces 842. Accordingly, SAS application modules 848 may analyze data produced by gas chromatograph mass spectrometers 846, or infrared spectrometers 844, or chromatographic instruments 850, or nuclear magnetic resonance instruments 852, or any other application instrument interoperative with application interface 842. Interface module 854 is a generalized application module which may represent either an instrument or an analysis module.

Utilization of the present invention, using configuration data structure 100 as set forth in FIG. 1, greatly simplifies the problem of interchanging data between various modules interfacing scientific instruments, such as modules 844, 846, 850, 852, and generalized application 854, with data analysis programs such as data analysis program SAS 848 or other analysis programs represented by module 854. Additionally, an application interface module for a spread sheet 856 may also advantageously be used through the present invention for accessing data created, and stored, by scientific instrument modules.

As further examples, generalized application 854 may include data analysis modules prepared by specific vendors for their instruments. An advantage of the present invention, is that a data analysis module prepared by a first vendor may be used to analyze data from an instrument purchased from a second vendor, by allowing the instrument to be represented as source 802, and the analysis module to be represented as target 804 as shown in FIG. 10.

Figure 13:
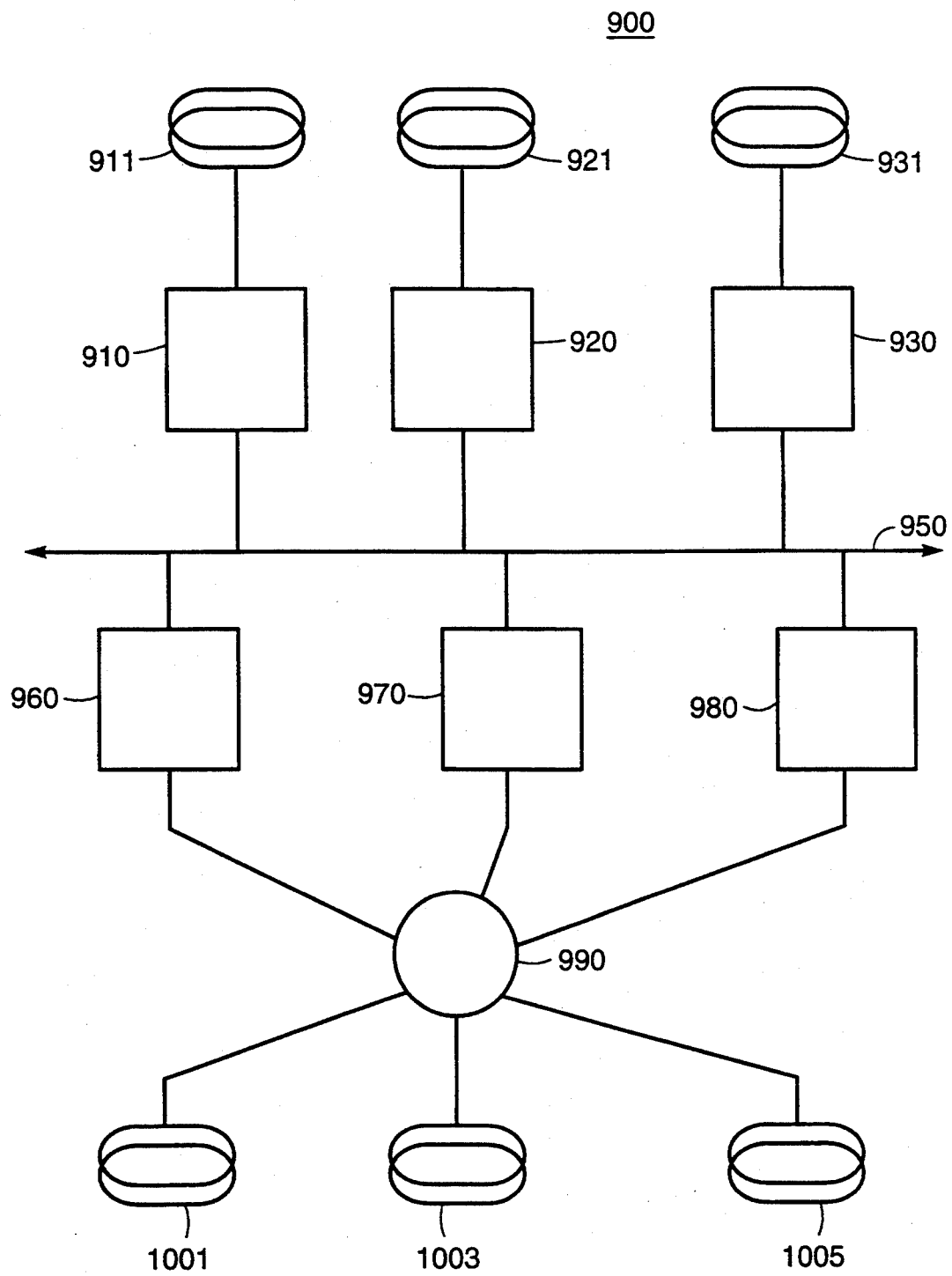

Turning now to FIG. 13, there is shown generally a networked computer system 900. Computers 910, 920, 930 are shown as independent computers, each with a disk storage unit 911, 921, 931, respectively. Communications pathway 950 provides a link for communications between computers 910, 920, 930. Also shown are computers 960, 970, 980, and computers 960, 970, 980 are connected through hub 990 to share disk storage units 1001, 1003, 1005. Communications pathway 950 also provides a link between computers 960, 970, 980 and all other computers connected to communications pathway 950. For example, communications pathway 950 may connect hundreds of computers into computer communications.

In operation, a software module operating on one computer, say for example, computer 910, can address data stored on any disk unit attached to any computer connected to communications pathway 950. For example, data stored on disk unit 1001 may be obtained by a software module running on computer 910 by a messaging protocol between computer 910 and any of the computers 960, 970, 980 connected through hub 990 to disk unit 1001. Also, any other computer connected to communications pathway 950 may obtain, or write, data to disk unit 911 by using a messaging protocol with computer 910.

Accordingly, mapping parameter 150-9 from FIG. 2 contains a pointer to the location where the corresponding table data values are stored on the computer system.

That is, some table data values may be stored on one disk, for example disk unit 911, other table data values may be stored on another disk unit, for example disk unit 1001, or 1003, or 921, or 931, etc. Mapping parameter 150-9 is a sufficient mechanism for a software module running on any of the computers to keep track of the location of the corresponding data values. Even further, any of the software modules of the present invention may run on any of the computers in a computer system 900. For example, a control module may be invoked on a particular computer, say computer 910. This control module may then invoke other needed modules on the same computer, for example, computer 910, or may alternatively invoke any needed software module on any other computer 920, 930, 960, 970, 980 etc., connected to the communications system 950. Distributed processing, as described herein, may be accomplished by, for example, remote procedure calls between the various software modules.

As will be recognized by those skilled in the art of scientific data interchange between instruments and data analysis modules, the advantages and conveniences of the invention will be apparent, and will have uses for interchanging data far beyond the examples set forth herein.

It is to be understood that the above-described embodiments are simply illustrative of the principles of the invention. Various other modifications and changes may be made by those skilled in the art which will embody the principles of the invention and fall within the spirit and scope thereof.

What is claimed is:

1. An apparatus for storing analytical measurement data, comprising:

means for measuring physical data from a chemical sample;

means for storing a configuration data structure, said configuration data structure having a plurality of data items, a one of said plurality of data items further having a name, a data type, a size, and a mapping parameter, said plurality of data items further having, administrative data
   instrument identification data
   global sample identification data
   detection method data
   raw unprocessed data
   data peak processing method
   data peak processing results
   instrument calibration data
   multicomponent sample calibration method
   results from multicomponent sample calibration
   sample sequence data
   dimension data
   control events for instrument
   reprocessing method data
   reprocessing results means for arranging ones of said plurality of data items into at least one group, said at least one group defining a table data structure;

said table data structure having a plurality of table data values, said table data values arranged in a plurality of columns and in a plurality of rows, a one of said table data values identified by a said column and a said row;

means, responsive to a one of said data items of said configuration data structure, for defining a one column of said plurality of columns;

means, responsive to said mapping parameter of said one said data items, for referencing said one column of said table data structure; and, means for storing at least one set of data, obtained by said measuring means, in a predetermined row of said table data structure, said table data structure and said configuration data structure defining a data model and data corresponding to said model accommodated in each said row.

2. The apparatus as in claim 1 further comprising:
   means for editing said configuration data structure, to define said data model.

3. The apparatus as in claim 1, wherein said table data values further comprise:
   at least one of said table data values capable of containing an n dimensional array, said n dimensional array having a plurality of elements.

4. The apparatus as in claim 1, wherein said table data values further comprise:
   at least one of said table data values capable of containing an arbitrary data structure.

5. The apparatus as in claim 1 wherein said plurality of data items of said configuration data structure further comprises:
   indicators of a class, a superclass, and a sub class, to indicate a node location of said data item in a hierarchical data structure.

6. The apparatus as in claim 1 wherein said table data structure further comprises:
   means for storing a said one of said plurality of data items as a header of said one column defined in response to said one of said plurality of data items, to make data stored in said one column self describing.

7. An apparatus for interchanging analytical measurement data between at least one source and at least one target, comprising:

means for measuring physical data from a chemical sample;

means for storing a configuration data structure, said configuration data structure having, a plurality of data items, a one of said plurality of data items further having a name, a data type, a size, a required flag, a modifiable flag, and a mapping parameter, said plurality of data items further having, administrative data
   instrument identification data
   global sample identification data
   detection method data
   raw unprocessed data
   data peak processing method
   data peak processing results
   instrument calibration data
   multicomponent sample calibration method
   results from multicomponent sample calibration
   sample sequence data
   dimension data
   control events for instrument
   reprocessing method data
   reprocessing results means for arranging ones of said plurality of data items into at least one group, said at least one group defining a table data structure;

said table data structure having a plurality of table data values, said table data values arranged in a plurality of columns and in a plurality of rows, a one of said table data values identified by a said column and a said row;

means, responsive to a one of said data items of said configuration data structure, for defining a one column of said plurality of columns;

means, responsive to said mapping parameter of said one of said data items, for referencing data stored in said one column of said table data structure;

means for said at least one source with a source format to store selected data in at least one row of said table data structure; and, means for said at least one target to read said selected data from said table data structure and to present said selected data in a target format.

8. The apparatus as in claim 1 or claim 7 wherein said configuration data structure further has a required flag, and a modifiable flag.

9. An apparatus for storing analytical measurement data, comprising:

means for measuring physical data from a chemical sample;

means for storing a configuration data structure, said configuration data structure having
a plurality of data items, a one of said plurality of data items further having a name, a data type, a size, a required flag, a modifiable flag, and a mapping parameter, said plurality of data items further having,
administrative data
instrument identification data
global sample identification data
detection method data
raw unprocessed data
data peak processing method
data peak processing results
instrument calibration data
multicomponent sample calibration method
results from multicomponent sample calibration
sample sequence data
dimension data
control events for instrument
reprocessing method data
reprocessing results means for editing said configuration data structure;

means for arranging in said configuration data structure indicators of a class, a superclass, and a sub class, to indicate a node location of said data item in a hierarchical data structure;

means for arranging ones of said plurality of data items into at least one group, said at least one group defining a table data structure;

means for storing said table data structure;

said table data structure having a plurality of table data values, said table data values arranged in a plurality of columns and in a plurality of rows, a one of said table data values identified by a said column and a said row;

means, responsive to a one of said data items of said configuration data structure, for defining a one column of said plurality of columns;

means, responsive to said mapping parameter of said one said data items, for referencing said one column of said table data structure;

means for storing at least one set of data in a predetermined row of said table data structure, said table data structure and said configuration data structure defining a data model, and data corresponding to said model is accommodated in each said row; and, means, responsive to said editing and responsive to said indicators of a class, a superclass, and a sub class, for defining a hierarchical data structure for said data model.

10. An apparatus for storing data, comprising:

means for measuring physical data from a chemical sample;

means for storing a configuration data structure, said configuration data structure having
a plurality of data items, a one of said plurality of data items further having a name, a data type, a size, a required flag, a modifiable flag, and a mapping parameter, said plurality of data items further having,
administrative data
instrument identification data
global sample identification data
detection method data
raw unprocessed data
data peak processing method
data peak processing results
instrument calibration data
multicomponent sample calibration method
results from multicomponent sample calibration
sample sequence data
dimension data
control events for instrument
reprocessing method data
reprocessing results means for editing said configuration data structure;

means for arranging in said configuration data structure indicators of a class, a superclass, and a sub class, to indicate a node location of said data item in a hierarchical data structure;

means for arranging ones of said plurality of data items into at least one group, said at least one group defining a table data structure;

means for storing said table data structure to a computer disk;

said table data structure having a plurality of table data values, said table data values arranged in a plurality of columns and in a plurality of rows, a one of said table data values identified by a said column and a said row;

means, responsive to a one of said data items of said configuration data structure, for defining a one column of said plurality of columns;

means, responsive to said mapping parameter of said one said data items, for referencing said one column of said table data structure;

means for storing at least one set of data in a predetermined row of said table data structure, said table data structure and said configuration data structure defining a data model, and data corresponding to said model is accommodated in each said row; and, means, responsive to said editing and responsive to said indicators of a class, a superclass, and a sub class, for defining a hierarchical data structure for said data model.

11. The apparatus as in claim i wherein said means for storing said table data structure further comprises a computer disk.

12. The apparatus as in claim 10 or claim 11 further comprising:
said apparatus is a computer and said computer disk is attached to said computer.

13. The apparatus as in claim 10 or claim 11 further comprising: said apparatus is a computer and said computer disk is reached by communications by said computer over a computer communications network.

14. The apparatus as in claim 1 or claim 7 or claim 9 or claim 10 wherein said configuration data structure further comprises:
    separation experiment data
    chromatographic column data
    analog to digital conversion data
    sample raw data.

15. An apparatus as in claim 1 where said table data values further comprise:
    at least one of said table data values containing a spread sheet.

16. An apparatus for storing data, comprising:
    a computer memory;
    means for storing a configuration data structure, said configuration data structure having
        a plurality of data items, a one of said plurality of data items further having a name, a data type, a size, and a mapping parameter, said plurality of data items further having,
        administrative data
        instrument identification data
        global sample identification data
        detection method data
        raw unprocessed data
        data peak processing method
        data peak processing results
        instrument calibration data
        multicomponent sample calibration method
        results from multicomponent sample calibration
        sample sequence data
        dimension data
        control events for instrument
        reprocessing method data
        reprocessing results
    means for arranging ones of said plurality of data items into at least one group, said at least one group defining a table data structure;
    said table data structure having a plurality of table data values, said table data values arranged in a plurality of columns and in a plurality of rows, a one of said table data values identified by a said column and a said row;
    means, responsive to a one of said data items of said configuration data structure, for defining a one column of said plurality of columns;
    means, responsive to said mapping parameter of said one said data items, for referencing said one column of said table data structure;
    means for storing at least one set of data, obtained by said measuring means, in a predetermined row of said table data structure, said table data structure and said configuration data structure defining a data model and data corresponding to said model accommodated in each said row; and,
    means for adding rows to said table data structure stored in said computer memory.

17. An apparatus as in claim 16 wherein said computer memory is computer disks.

* * * * *